(12) United States Patent
Kim et al.

(10) Patent No.: US 9,277,294 B2
(45) Date of Patent: Mar. 1, 2016

(54) METHOD FOR OPERATING IMAGE DISPLAY APPARATUS

(71) Applicant: LG ELECTRONICS INC., Seoul (KR)

(72) Inventors: Uniyoung Kim, Seoul (KR); Choonkeun Youn, Seoul (KR); Hyeran Jang, Seoul (KR); Kunsik Lee, Seoul (KR); Byunghun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/104,452

(22) Filed: Dec. 12, 2013

(65) Prior Publication Data

US 2014/0366061 A1 Dec. 11, 2014

(30) Foreign Application Priority Data

Jun. 11, 2013 (KR) .................. 10-2013-0066678

(51) Int. Cl.
*G06F 3/00* (2006.01)
*H04N 21/81* (2011.01)
*H04N 21/482* (2011.01)

(52) U.S. Cl.
CPC ....... *H04N 21/8126* (2013.01); *H04N 21/4821* (2013.01); *H04N 21/4826* (2013.01)

(58) Field of Classification Search
CPC .................. H04N 21/482; H04N 5/44543
USPC .......................................... 725/40
See application file for complete search history.

(56) References Cited

U.S. PATENT DOCUMENTS

| | | | |
|---|---|---|---|
| 6,822,661 B2* | 11/2004 | Sai et al. | 715/716 |
| 8,930,999 B1* | 1/2015 | Maeng | 725/41 |
| 2002/0124256 A1 | 9/2002 | Suzuka | |
| 2005/0022236 A1 | 1/2005 | Ito et al. | |
| 2007/0022436 A1 | 1/2007 | Song | |
| 2007/0039023 A1 | 2/2007 | Kataoka | |
| 2007/0050813 A1 | 3/2007 | Lee | |
| 2010/0083316 A1 | 4/2010 | Togashi et al. | |
| 2010/0267370 A1 | 10/2010 | Lee | |
| 2011/0247039 A1* | 10/2011 | Cheng et al. | 725/52 |
| 2012/0027377 A1 | 2/2012 | Tsukagoshi et al. | |
| 2012/0297420 A1 | 11/2012 | Mountain | |
| 2014/0068668 A1* | 3/2014 | Needham et al. | 725/39 |
| 2014/0245357 A1* | 8/2014 | Huntington et al. | 725/52 |

FOREIGN PATENT DOCUMENTS

EP 2 290 957 A1 3/2011

* cited by examiner

*Primary Examiner* — Nathan Flynn
*Assistant Examiner* — Alfonso Castro
(74) *Attorney, Agent, or Firm* — Birch, Stewart, Kolasch & Birch, L.L.P.

(57) ABSTRACT

A method for operating an image display apparatus includes displaying a timeline indicating past, current and future time regions based on a current time, displaying first information about a past broadcast program in the past time region, displaying second information about a current broadcast program in the current time region, displaying third information about a future broadcast program in the future time region. Items included in the first information may be displayed in a list type format and items included in the second information and the third information may be displayed in a thumbnail type format. Therefore, since visually differentiated content is displayed along the timeline, it is possible to support various functions and to increase user convenience.

16 Claims, 28 Drawing Sheets

METHOD FOR OPERATING IMAGE DISPLAY APPARATUS

CROSS-REFERENCE TO RELATED APPLICATION

This application claims the priority benefit of Korean Patent Application No. 10-2013-0066678, filed on Jun. 11, 2013, in the Korean Intellectual Property Office, the disclosure of which is incorporated herein by reference.

BACKGROUND OF THE INVENTION

1. Field of the Invention

The present invention relates to an image display apparatus and a method for operating the same, and more particularly, to an image display apparatus and a method for operating the same, which are capable of displaying visually differentiated content along a timeline to provide various functions and convenience.

2. Description of the Related Art

An image display apparatus functions to display images to a user. A user can view a broadcast program using an image display apparatus. The image display apparatus can display a broadcast program selected by the user on a display from among broadcast programs transmitted from broadcast stations. The recent trend in broadcasting is a worldwide transition from analog broadcasting to digital broadcasting.

Digital broadcasting transmits digital audio and video signals. Digital broadcasting offers many advantages over analog broadcasting, such as robustness against noise, less data loss, ease of error correction, and the ability to provide clear, high-definition images. Digital broadcasting also allows interactive viewer services, compared to analog broadcasting.

SUMMARY OF THE INVENTION

Therefore, the present invention has been made in view of the above problems, and it is an object of the present invention to provide an image display apparatus and a method for operating the same, which are capable of displaying visually differentiated content along timeline to provide various functions and convenience.

In accordance with an aspect of the present invention, the above and other objects can be accomplished by the provision of a method for operating an image display apparatus including displaying a timeline indicating past, current and future time regions based on a current time, displaying first information about a past broadcast program in the past time region, displaying second information about a current broadcast program in the current time region, displaying third information about a future broadcast program in the future time region, wherein items included in the first information may be displayed in a list type format and items included in the second information and the third information may be displayed in a thumbnail type format.

In accordance with another aspect of the present invention, there is provided a method for operating an image display apparatus including displaying a timeline indicating past, current and future time regions based on a current time, displaying information about broadcast programs corresponding to the past, current and future time regions, receiving input for selecting the timeline, and extending the timeline to include time information selectable by a user.

According to the present invention, since visually differentiated content is displayed along a timeline and is easily controlled using a pointer corresponding to movement of a remote controller, it is possible to support various functions and to increase user convenience.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Exemplary embodiments of the present invention will be described with reference to the attached drawings.

The terms "module" and "unit" used in description of components are used herein to help the understanding of the components and thus should not be misconstrued as having specific meanings or roles. Accordingly, the terms "module" and "unit" may be used interchangeably.

Figure 1:
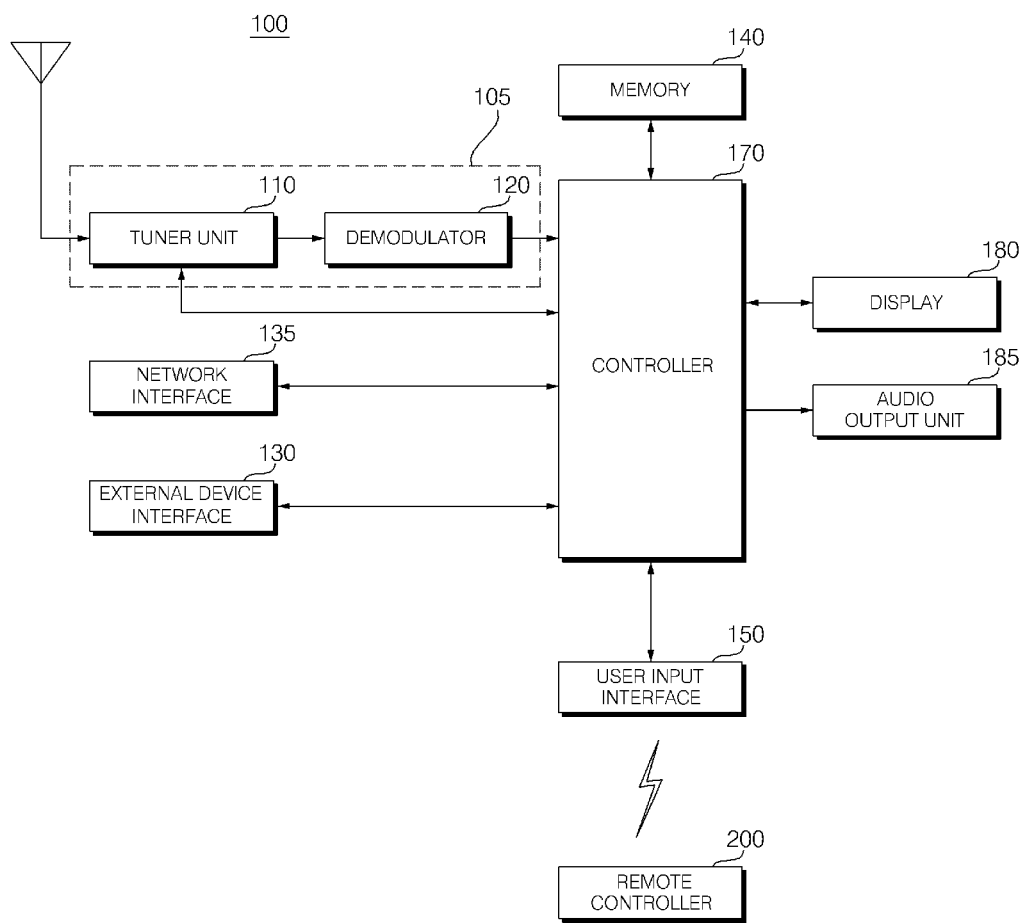
FIG. 1 is a block diagram showing the internal configuration of an image display apparatus according to an embodiment of the present invention.

FIG. 1 is a block diagram showing the internal configuration of the image display apparatus according to an embodiment of the present invention.

Referring to FIG. 1, the image display apparatus 100 according to the embodiment of the present invention includes a broadcast reception unit 105, an external device interface 130, a memory 140, a user input interface 150, a sensor unit (not shown), a controller 170, a display 180 and an audio output unit 185.

The broadcast reception unit 105 may include a tuner unit 110, a demodulator 120 and a network interface 135. As needed, the broadcast reception unit 105 may include only the tuner unit 110 and the demodulator 120 or only the network interface 135.

The tuner unit 110 tunes to a Radio Frequency (RF) broadcast signal corresponding to a channel selected by a user from among RF broadcast signals received through an antenna or RF broadcast signals corresponding to all channels previously stored in the image display apparatus. The tuned RF broadcast is converted into an Intermediate Frequency (IF) signal or a baseband Audio/Video (AV) signal.

For example, the tuned RF broadcast signal is converted into a digital IF signal DIF if it is a digital broadcast signal and is converted into an analog baseband AV signal (Composite Video Banking Sync/Sound Intermediate Frequency (CVBS/SIF)) if it is an analog broadcast signal. That is, the tuner unit 110 may process a digital broadcast signal or an analog broadcast signal. The analog baseband AV signal (CVBS/SIF) output from the tuner unit 110 may be directly input to the controller 170.

The tuner unit 110 may be capable of receiving RF broadcast signals from an Advanced Television Systems Committee (ATSC) single-carrier system or from a Digital Video Broadcasting (DVB) multi-carrier system.

The tuner unit 110 may sequentially select a number of RF broadcast signals corresponding to all broadcast channels previously stored in the image display apparatus by a channel storage function from a plurality of RF signals received through the antenna and may convert the selected RF broadcast signals into IF signals or baseband A/V signals.

The tuner unit 110 may include a plurality of tuners in order to receive broadcast signals of a plurality of channels. Alternatively, the tuner unit may include a single tuner for simultaneously receiving broadcast signals of a plurality of channels.

The demodulator 120 receives the digital IF signal DIF from the tuner unit 110 and demodulates the digital IF signal DIF.

The demodulator 120 may perform demodulation and channel decoding, thereby obtaining a stream signal TS. The stream signal may be a signal in which a video signal, an audio signal and a data signal are multiplexed.

The stream signal output from the demodulator 120 may be input to the controller 170 and thus subjected to demultiplexing and A/V signal processing. The processed video and audio signals are output to the display 180 and the audio output unit 185, respectively.

The external device interface 130 may serve to transmit or receive data to or from an external device (not shown) connected thereto. For interfacing, the external device interface 130 may include an A/V Input/Output (I/O) unit (not shown) and/or a wireless communication module (not shown).

The external device interface 130 may be connected to an external device such as a Digital Versatile Disc (DVD) player, a Blu-ray player, a game console, a camera, a camcorder, or a computer (e.g., a laptop computer), wirelessly or by wire so as to perform an input/output operation with respect to the external device.

The A/V I/O unit externally receives video and audio signals from the external device. The wireless communication unit may perform short-range wireless communication with another electronic apparatus.

The network interface 135 serves as an interface between the image display apparatus 100 and a wired/wireless network such as the Internet. The network interface 135 may receive content or data provided by an Internet or content provider or a network operator over a network.

The network interface 135 performs data communication with an electronic apparatus located near the image display apparatus 100. At this time, the network interface 135 may receive apparatus information of another electronic apparatus or remote controllable channel information, frequency information or code information of another electronic apparatus.

The memory 140 may store various programs necessary for the controller 170 to process and control signals, and may also store processed video, audio and data signals.

The memory 140 may temporarily store a video, audio and/or data signal received from the external device interface 130. The memory 140 may store information about a predetermined broadcast channel by the channel storage function of a channel map.

In addition, the memory 140 may store infrared ray (IR) format key codes for controlling other electronic apparatuses as IR signals and store an IR format key database of a plurality of electronic apparatuses.

While the memory 140 is shown in FIG. 1 as being configured separately from the controller 170, to which the present invention is not limited, the memory 140 may be incorporated into the controller 170.

The user input interface 150 transmits a signal input by the user to the controller 170 or transmits a signal received from the controller 170 to the user.

For example, the user input interface 150 may transmit/receive various user input signals such as a power-on/off signal, a channel selection signal, and a screen setting signal from a remote controller 200, may provide the controller 170 with user input signals received from local keys (not shown), such as inputs of a power key, a channel key, and a volume key, and setting values, or provide the controller 170 with a user input signal received from a sensor unit (not shown) for sensing a user gesture, or transmit a signal received from the controller 170 to a sensor unit (not shown).

According to an embodiment of the present invention, the user input interface 150 may receive personal information from the remote controller 200. The user input interface 150 may further receive information about a web server accessed by the personal information in addition to the personal information.

For example, if a mobile terminal 300 approaches the remote controller 200 to perform near field communication (NFC), the remote controller 200 may receive personal information stored in the mobile terminal 300. The remote controller 200 may transmit the personal information to the image display apparatus 100 according to an IR method or an RF method. At this time, the user input interface 150 transmits the received personal information to the controller 170.

At this time, the personal information may include personal ID information, password information and personal email information, etc. of the mobile terminal 300. Alternatively, the personal information may include personal ID information, password information and personal email information, etc. of the image display apparatus 100. Alternatively, the personal information may include commonly available personal ID information and password information of various electronic apparatus including the mobile terminal 300. Alternatively, the personal information may include personal ID information or password information of a predetermined pre-stored web server available in the mobile terminal 300. Alternatively, the personal information may include personal. ID information or password information of a predetermined web server available in the image display apparatus 10Q including the mobile terminal 300. Alternatively, the personal information may include personal ID information or password information of a server connected to the image display apparatus 100.

That is, the personal information may be necessary to log in to an electronic apparatus or service through a predetermined account.

The user input interface 150 may receive apparatus information of another electronic apparatus or remote controllable channel information, frequency information or code information of another electronic apparatus from an electronic apparatus located near the image display apparatus 100 through the remote controller 200.

The controller 170 may demultiplex the stream signal received from the tuner unit 110, the demodulator 120, or the external device interface 130 into a number of signals, process the demultiplexed signals into audio and video data, and output the audio and video data.

The video signal processed by the controller 170 may be displayed as an image on the display 180. The video signal processed by the controller 170 may also be transmitted to an external output device through the external device interface 130.

The audio signal processed by the controller 170 may be output to the audio output unit 185. Also, the audio signal processed by the controller 170 may be transmitted to the external output device through the external device interface 130.

While not shown in FIG. 1, the controller 170 may include a DEMUX, a video processor, etc., which will be described in detail later with reference to FIG. 2.

The controller 170 may control the overall operation of the image display apparatus 100. For example, the controller 170 controls the tuner unit 110 to tune to an RF signal corresponding to a channel selected by the user or a previously stored channel.

The controller 170 may control the image display apparatus 100 by a user command input through the user input interface 150 or an internal program.

The controller 170 may control the display 180 to display images. The image displayed on the display 180 may be a Two-Dimensional (2D) or Three-Dimensional (3D) still or moving image.

The controller 170 may generate and display a predetermined object of an image displayed on the display 180 as a 3D object. For example, the object may be at least one of a screen of an accessed web site (newspaper, magazine, etc.), an electronic program guide (EPG), various menus, a wiget, an icon, a still image, a moving image, text, etc.

The controller 170 recognizes the position of the user based on an image captured by a camera unit (not shown). For example, a distance (z-axis coordinate) between the user and the image display apparatus 100 may be detected. An x-axis coordinate and a y-axis coordinate in the image display apparatus 100 corresponding to the position of the user may be detected.

According to an embodiment of the present invention, the controller 170 may control login based the personal information received from the remote controller 200. A this time, login may be login of the image display apparatus 100, login of a server connected to the image display apparatus 100, or login of a predetermined web server to which a user subscribes using personal information thereof.

For example, if the user logs in to the image display apparatus 100 using personal ID information and password information received from the remote controller 200, the controller 170 may control the display 180 to display a personal screen of the user set according to a user account. If there is an image which is being viewed, the controller 170 may control the display 180 to display a personal setting screen along with the image which is being viewed. Alternatively, the controller 170 may switch the image, which is being viewed, to a personal setting screen.

As another example, if the user logs in to the server connected to the image display apparatus 100, the controller 170 may control the display 180 to display a server connection screen received from the server and, more particularly, an app server screen. If there is an image which is being viewed, the controller 170 may control the display 180 to display a server connection screen along with the image which is being viewed. Alternatively, the controller 170 may switch the image, which is being viewed, to a server connection screen.

As another example, if received personal information is for predetermined web servers accessed by the mobile terminal 300, the controller 170 may control access of the image display apparatus 100 to the web servers and display of a screen for the accessed server on the display 180. At this time, the web servers may provide social network services. If there is an image which is being viewed, the controller 170 may control display of a screen for the accessed web server along with the image which is being viewed. Alternatively, the controller 170 may switch the image, which is being viewed, to a screen for the accessed web server.

The controller 170 may control a power supply (not shown) for supplying power to the image display apparatus 100 if the image display apparatus 100 is in an off state when the personal information is received. That is, if the user input interface 150 receives the personal information in a standby mode, the controller 170 may switch the standby mode to a wakeup mode and control the power supply to supply power to various modules or units.

The controller 170 may determine whether each electronic apparatus is connected according to the personal information from the remote controller 200 based on apparatus information of another electronic apparatus located near the image display apparatus 100 or remote controllable channel information, frequency information or code information of another electronic apparatus, which is received from the network interface 135 or the user input interface 150, and control the display 180 to display an object indicating that another electronic apparatus has been logged in.

Alternatively, the controller 170 may control transmission of apparatus information, channel information, frequency information and code information to the remote controller 200, based on apparatus information of another electronic apparatus located near the image display apparatus 100 or remote controllable channel information, frequency information or code information of another electronic apparatus.

Although not shown, a channel browsing processor for generating a thumbnail image corresponding to a channel signal or an external input signal may be further included. The channel browsing processor may receive the stream signal TS output from the demodulator 120 or the stream signal output from the external device interface 130, extract an image from the received stream signal, and generate a thumbnail image. The generated thumbnail image may be decoded into a stream form to be input to the controller 170 together with the decoded image. The controller 170 may display a thumbnail list including a plurality of thumbnail images on the display 180 using the input thumbnail image.

The thumbnail list may be displayed in a brief viewing method of displaying the thumbnail list in a part of an area in a state of displaying a predetermined image or may be displayed in a full viewing method of displaying the thumbnail list in a full area. The thumbnail images in the thumbnail list may be sequentially updated.

The display 180 converts the video signal, the data signal, the OSD signal and the control signal processed by the controller 170 or the video signal, the data signal and the control signal received by the external device interface 130 and generates a drive signal.

The display 180 may be a Plasma Display Panel (PDP), a Liquid Crystal Display (LCD), an Organic Light-Emitting Diode (OLED) display or a flexible display. In particular, the display 180 may be a 3D display.

If the display 180 is a touchscreen, the display 180 may function as not only an output device but also as an input device.

The audio output unit 185 receives the audio signal processed by the controller 170 and outputs the received audio signal as sound.

The camera unit (not shown) captures images of a user. The camera unit (not shown) may be implemented by one camera, but the present invention is not limited thereto. That is, the camera unit may be implemented by a plurality of cameras. The camera unit (not shown) may be embedded in the image display apparatus 100 at the upper side of the display 180 or may be separately provided. Image information captured by the camera unit (not shown) may be input to the controller 170.

The controller 170 may sense a user gesture from an image captured by the camera unit (not shown), a signal sensed by the sensor unit (not shown), or a combination of the captured image and the sensed signal.

The remote controller 200 transmits user input to the user input interface 150. For transmission of user input, the remote controller 200 may use various communication techniques such as Bluetooth, RF communication, IR communication, Ultra Wideband (UWB), ZigBee and near field communication (NFC).

In addition, the remote controller 200 may receive a video signal, an audio signal or a data signal from the user input interface 15. The remote controller 200 output the received signals visually or audibly based on the received video, audio or data signal.

The remote controller 200 according to the embodiment of the present invention may receive information by near field communication with a predetermined electronic apparatus. The information may include personal ID information and password information which may be used in the mobile terminal, the image display apparatus or the electronic apparatus, as described above.

The remote controller 200 may transmit the received personal information to the image display apparatus 100. As this time, an IR method or an RF method may be used as the communication method.

In the embodiment of the present invention, it is assumed that the remote controller 200 is a pointing device for displaying a pointer corresponding to user motion. That is, the remote controller 200 may transmit personal information to the image display apparatus 100 using an RF method.

The remote controller 200 may further receive information about a web server accessed by the personal information in addition to the personal information. For example, the remote controller 200 may receive web server information of a social network service which is being logged in and accessed by the mobile terminal. Such web server information is also transmitted to the image display apparatus 100.

The remote controller 200 may receive apparatus information of another electronic apparatus or remote controllable channel information, frequency information or code information of another electronic apparatus from an electronic apparatus located near the image display apparatus 100. Based on the information about another electronic apparatus, a channel, frequency or code may be allocated to the electronic apparatus so as to perform remote control.

The above-described image display apparatus 100 may be a fixed or mobile digital broadcast receiver capable of receiving a digital broadcast.

The block diagram of the image display apparatus 100 illustrated in FIG. 1 is only exemplary. Depending upon the specifications of the image display apparatus 100 in actual implementation, the components of the image display apparatus 100 may be combined or omitted or new components may be added. That is, two or more components may be incorporated into one component or one component may be configured as separate components, as needed. In addition, the function of each block is described for the purpose of describing the embodiment of the present invention and thus specific operations or devices should not be construed as limiting the scope and spirit of the present invention.

Unlike FIG. 1, the image display apparatus 100 may not include the tuner unit 110 and the demodulator 120 shown in FIG. 1 and may receive broadcast content via the network interface 135 or the external device interface 135 and play the broadcast content back.

Figure 2:
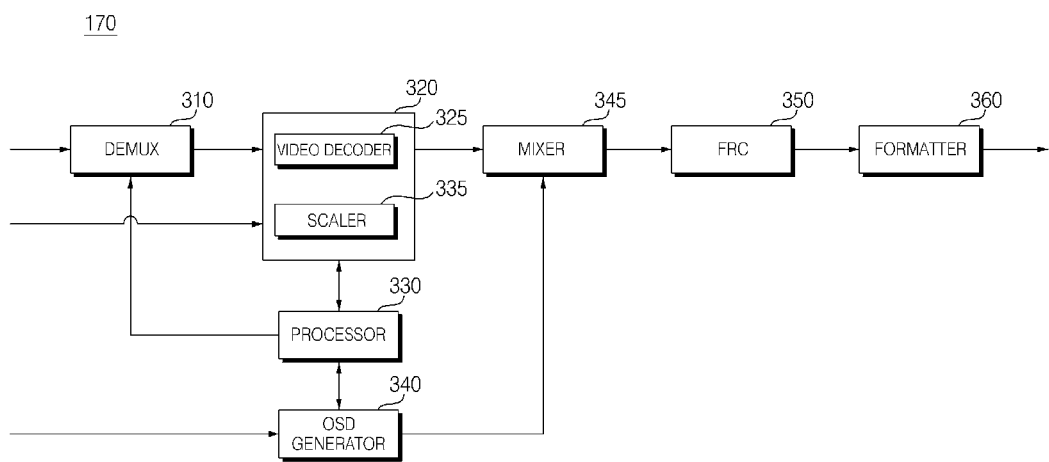
FIG. 2 is a block diagram showing the internal configuration of a controller of FIG. 1.

FIG. 2 is a block diagram showing the internal configuration of the controller illustrated in FIG. 1.

Referring to FIG. 2, the controller 170 according to the embodiment of the present invention may include a DEMUX 310, a video processor 320, a processor 330, an OSD generator 340, a mixer 345, a Frame Rate Converter (FRC) 350, and a formatter 360. The controller 170 may further include an audio processor (not shown) and a data processor (not shown).

The DEMUX 310 demultiplexes an input stream. For example, the DEMUX 310 may demultiplex an MPEG-2 TS into a video signal, an audio signal, and a data signal. The stream signal input to the DEMUX 310 may be received from the tuner unit 110, the demodulator 120 or the external device interface 135.

The video processor 320 may process the demultiplexed video signal. For video signal processing, the video processor 320 may include a video decoder 325 and a scaler 335.

The video decoder 325 decodes the demultiplexed video signal and the scaler 335 scales the resolution of the decoded video signal so that the video signal can be displayed on the display 180.

The video decoder 325 may be provided with decoders that operate based on various standards.

The processor 330 may control overall operation of the image display apparatus 100 or the controller 170. For example, the processor 330 may control the tuner unit 110 to tune to an RF broadcast corresponding to an RF signal corresponding to a channel selected by the user or a previously stored channel.

The processor 330 may control the image display apparatus 100 by a user command input through the user input interface 150 or an internal program.

The processor 330 may control data transmission of the network interface 135 or the external device interface 130.

The processor 330 may control the operation of the DEMUX 310, the video processor 320 and the OSD generator 340 of the controller 170.

The OSD generator 340 generates an OSD signal autonomously or according to user input. For example, the OSD generator 340 may generate signals by which a variety of information is displayed as graphics or text on the display 180, according to user input signals. The OSD signal may include various data such as a User Interface (UI), a variety of menus, widgets, icons, etc. Also, the OSD signal may include a 2D object and/or a 3D object.

The OSD generator 340 may generate a pointer which can be displayed on the display according to a pointing signal received from the remote controller 200. In particular, such a pointer may be generated by a pointing signal processor and the OSD generator 340 may include such a pointing signal processor (not shown). Alternatively, the pointing signal processor (not shown) may be provided separately from the OSD generator 340.

In association with the embodiment of the present invention, the OSD generator 340 may generate or configure a set personal screen if the user logs in to the image display apparatus 100. Alternatively, the OSD generator 340 may generate or configure at least a part of a server access screen so as to display a server access screen received from a server on the display 180 if the user logs in to the accessed server. Alternatively, the OSD generator 340 may generate or configure at least a part of a web server access screen based on information about a web server which is being accessed by personal information.

The mixer 345 may mix the decoded video signal processed by the video processor 320 with the OSD signal generated by the OSD generator 340. Each of the OSD signal and the decoded video signal may include at least one of a 2D signal and a 3D signal. The mixed video signal is provided to the FRC 350.

The FRC 350 may change the frame rate of an input image. The FRC 350 may maintain the frame rate of the input image without frame rate conversion.

The formatter 360 changes the format of the signal mixed by the mixer 345, that is, the OSD signal and decoded video signal, to be suitable for the display 180. For example, the formatter 360 may convert a received signal into an RGB data signal. The RGB signal may be output in the form of a Low Voltage Differential Signal (LVDS) or mini-LVDS.

The formatter 360 may separate a 2D video signal and a 3D video signal, for 3D video display. The formatter 360 may change the format of a 3D video signal or convert a 2D video signal into a 3D video signal.

The audio processor (not shown) of the controller 170 may process the demultiplexed audio signal. For audio signal processing, the audio processor may have various decoders.

The audio processor (not shown) of the controller 170 may also adjust the bass, treble or volume of the audio signal.

The data processor (not shown) of the controller 170 may process the demultiplexed data signal. For example, if the demultiplexed data signal was encoded, the data processor may decode the data signal. The encoded data signal may be Electronic Program Guide (EPG) information including broadcasting information such as the start time and end time of broadcast programs of each channel.

Although the formatter 360 performs 3D processing after the signals from the OSD generator 340 and the video processor 320 are mixed by the mixer 345 in FIG. 2, the present invention is not limited thereto and the mixer may be located at a next stage of the formatter.

The block diagram of the controller 170 shown in FIG. 2 is exemplary. The components of the block diagrams may be integrated or omitted, or a new component may be added according to the specifications of the controller 170.

In particular, the FRC 350 and the formatter 360 may be included separately from the controller 170.

Figure 3:
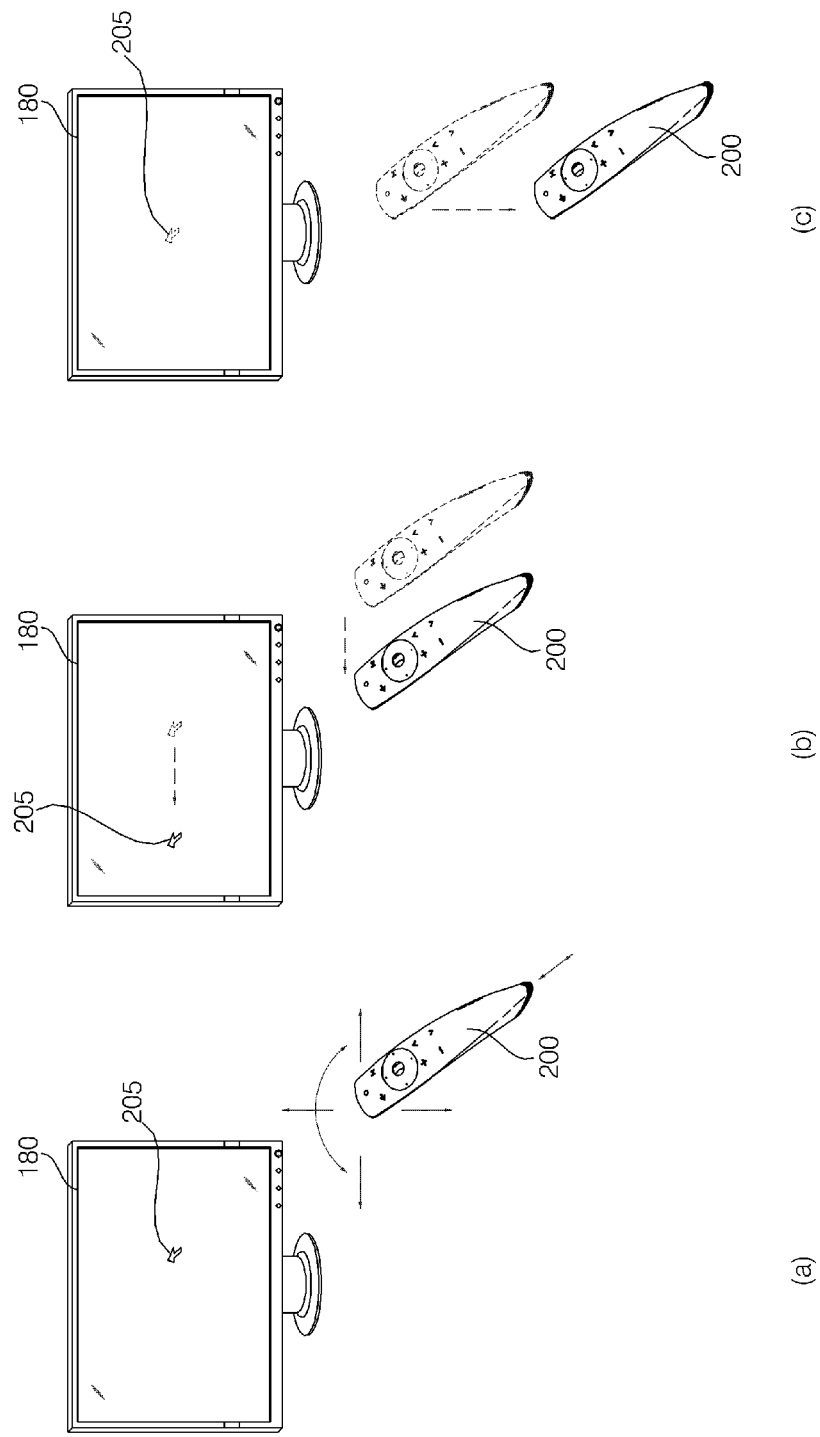
FIG. 3 is a diagram showing a method of controlling a remote controller of FIG. 1.

FIG. 3 is a diagram showing a method of controlling a remote controller of FIG. 1.

FIG. 3(*a*) illustrates a pointer 205 representing movement of the remote controller 200 displayed on the display 180.

The user may move or rotate the remote controller 200 up and down, side to side (FIG. 3(*b*)), and back and forth (FIG. 3(*c*)). The pointer 205 displayed on the display 180 of the image display apparatus corresponds to the movement of the remote controller 200. Since the pointer 205 moves in accordance with movement of the remote controller 200 in a 3D space, the remote controller 200 may be referred to as a pointing device.

Referring to FIG. 3(*b*), if the user moves the remote controller 200 to the left, the pointer 205 moves to the left on the display 180 of the image display apparatus.

Information about movement of the remote controller 200 sensed by the sensor of the remote controller 200 is transmitted to the image display apparatus. The image display apparatus may calculate the coordinates of the pointer 205 from the information about movement of the remote controller 200. Then, the image display apparatus may display the pointer 205 at the calculated coordinates.

Referring to FIG. 3(*c*), while pressing a predetermined button of the remote controller 200, the user moves the remote controller 200 away from the display 180. Then, a selection area corresponding to the pointer 205 may be zoomed in and enlarged on the display 180. On the contrary, if the user moves the remote controller 200 toward the display 180, the selection area corresponding to the pointer 205 is zoomed out and thus contracted on the display 180. Alternatively, when the remote controller 200 moves away from the display 180, the selection area may be zoomed out and when the remote controller 200 approaches the display 180, the selection area may be zoomed in.

With the predetermined button pressed in the remote controller 200, the up, down, left and right movements of the remote controller 200 may be ignored. That is, when the remote controller 200 moves away from or approaches the display 180, only the back and forth movements of the remote controller 200 are sensed, while the up, down, left and right movements of the remote controller 200 are ignored. Unless the predetermined button is pressed in the remote controller 200, the pointer 205 moves in accordance with the up, down, left or right movement of the remote controller 200.

The speed and direction of the pointer 205 may correspond to the speed and direction of the remote controller 200.

Figure 4:
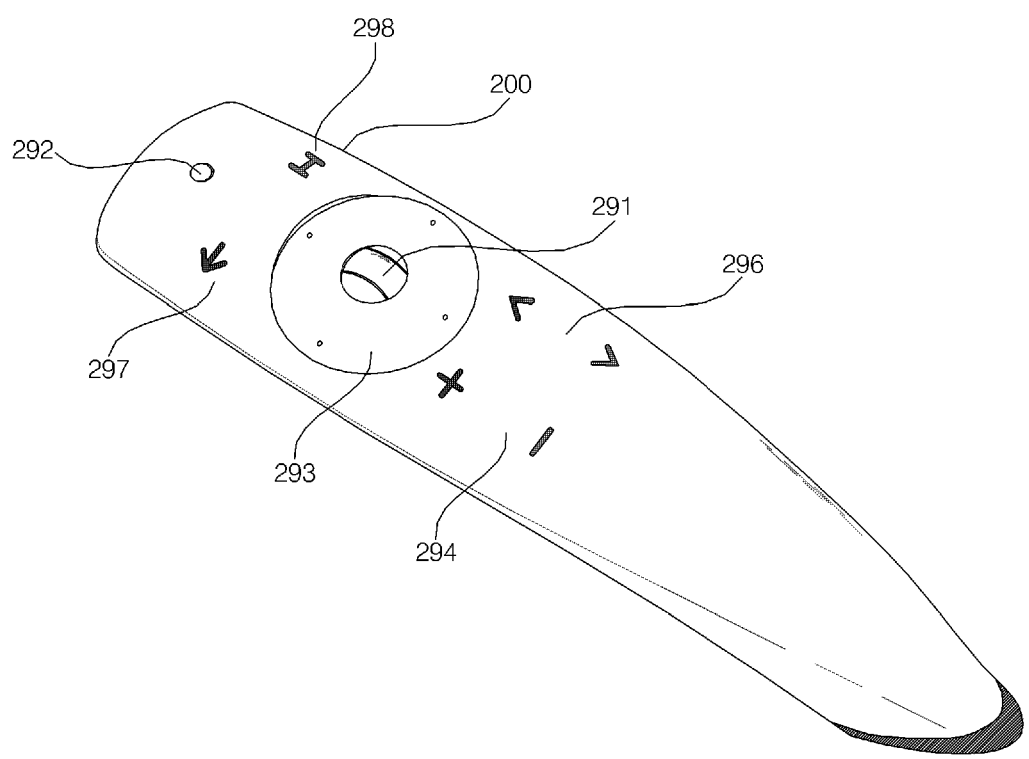
FIG. 4 is a perspective view of a remote controller according to an embodiment of the present invention.
Figure 5:
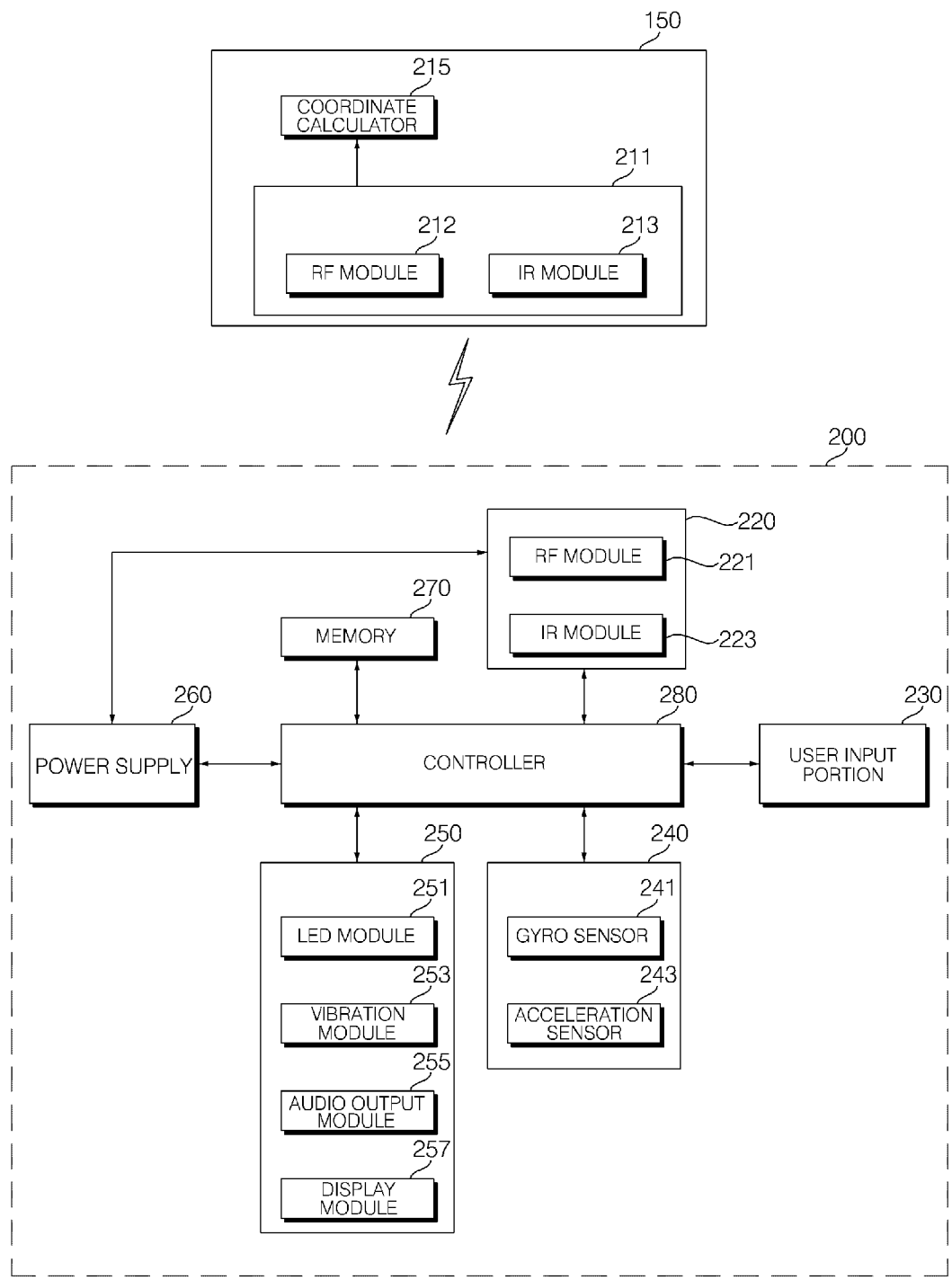
FIG. 5 is a block diagram showing the internal configuration of a remote controller according to an embodiment of the present invention.

FIG. 4 is a perspective view of a remote controller according to an embodiment of the present invention and FIG. 5 is a block diagram showing the internal configuration of a remote controller according to an embodiment of the present invention.

Referring to FIG. 4, the pointing device 201 according to the embodiment of the present invention may include various input keys, input buttons, etc.

For example, the pointing device 201 may include an okay key 291, a menu key 292, a 4-direction key 293, a channel control key 294, and a volume control key 296.

For example, the okay key 291 may be used to select a menu or item, the menu key 292 may be used to display a predetermined menu, the 4-direction key 293 may be used to move a pointer or indicator up, down, left and right, the channel control key 294 may be used to move a channel up or down, and the volume control key 296 may be used for volume control.

The pointing device 201 may further include a back key 297 and a home key 298. For example, the back key 297 may be used to move a screen to a previous screen and the home key 298 may be used to move a screen to a home screen.

As shown in FIG. 4, the okay key 291 may further include a scroll function. For the scroll function, the okay key 291 may be implemented as a wheel key. That is, if the okay key 291 is pushed, the okay key 291 is used to select a menu or item and, if the okay key 291 is scrolled up or down, the okay key 291 is used to scroll a display screen or switch a list page.

More specifically, when the okay key 291 is scrolled for image searching in a state in which an image having a size greater than the size of the display is displayed on the display 180, an image region which is not currently displayed is displayed on the display. As another example, if the okay key 291 is scrolled in a state in which a list page is displayed on the display 180, a previous page or a next page of a current page may be displayed.

Such a scroll function may be included separately from the okay key 291.

The four-direction key 293 may include up, down, left and right keys in a circular shape as shown in FIG. 4. Touch input using the four-direction key 293 may be possible. For example, if a touch operation from the up key to the down key in the four-direction key 293 is performed, a set function may be input or performed according to the touch input.

Referring to FIG. 5, the remote controller 200 may include a radio transceiver 220, a user input portion 230, a sensor portion 240, an output portion 250, a power supply 260, a memory 270, and a controller 280.

The radio transceiver 220 transmits and receives signals to and from any one of the image display devices according to the embodiments of the present invention. Among the image display apparatuses according to the embodiments of the present invention, for example, one image display apparatus 100 will be described.

In accordance with the exemplary embodiment of the present invention, the remote controller 200 may be provided with an RF module 221 for transmitting and receiving signals to and from the image display device 100 according to an RF communication standard. Also, the remote controller 200 may include an IR module 223 for transmitting and receiving signals to and from the image display device 100 according to an IR communication standard.

In addition, the remote controller 200 may further include an NFC module (not shown) for NFC with an electronic apparatus.

The remote controller 200 may transmit information about movement of the remote controller 200 to the image display apparatus 100 via the RF module 221.

The remote controller 200 may receive the signal from the image display apparatus 100 via the RF module 221. The remote controller 200 may transmit commands associated with power on/off, channel switching, volume change, etc. to the image display device 100 through the IR module 223.

According to the present embodiment, the remote controller 200 may receive personal information by NFC with a predetermined electronic apparatus.

The remote controller 200 may transmit the received personal information to the image display apparatus 100. At this time, an IR method or an RF method may be used as a communication method.

The remote controller 200 may further receive information about a web server accessed by the personal information in addition to the personal information. For example, the remote controller 200 may receive web server information of a social network service which is being logged in and accessed by the mobile terminal 300. Such web server information is also transmitted to the image display apparatus 100.

The remote controller 200 may receive apparatus information of another electronic apparatus or remote controllable channel information, frequency information or code information of another electronic apparatus. Based on the information about another electronic apparatus, channel, frequency or code may be allocated to the electronic apparatus so as to perform remote control.

The user input portion 230 may include a keypad, a key (button), a touch pad or a touchscreen. The user may enter a command related to the image display device 100 to the remote controller 200 by manipulating the user input portion 230. If the user input portion 230 includes hard keys, the user may enter commands related to the image display device 100 to the remote controller 200 by pushing the hard keys. If the user input portion 230 is provided with a touchscreen, the user may enter commands related to the image display device 100 to the remote controller 200 by touching soft keys on the touchscreen. Also, the user input portion 230 may have a variety of input means which may be manipulated by the user, such as a scroll key, a jog key, etc., to which the present invention is not limited.

The sensor portion 240 may include a gyro sensor 241 or an acceleration sensor 243. The gyro sensor 241 may sense information about movement of the remote controller 200.

For example, the gyro sensor 241 may sense information about movement of the remote controller 200 along x, y and z axes. The acceleration sensor 243 may sense information about the velocity of the remote controller 200. The sensor portion 240 may further include a distance measurement sensor for sensing a distance from the display 180. Alternatively, the sensor portion 240 may include a geomagnetic sensor for detecting flow of magnetic field generated in earth and detecting the point of the compass to detect change in the point of the compass.

The output portion 250 may output a video or audio signal corresponding to manipulation of the user input portion 230 or a signal transmitted by the image display device 100. The user may be aware from the output portion 250 whether the user input portion 230 has been manipulated or the image display device 100 has been controlled.

For example, the output portion 250 may include a Light Emitting Diode (LED) module 251 for illuminating when the user input portion 230 has been manipulated or a signal is transmitted to or received from the image display device 100 through the radio transceiver 220, a vibration module 253 for generating vibrations, an audio output module 255 for outputting audio, or a display module 257 for outputting video.

The power supply 260 supplies power to the remote controller 200. When the remote controller 200 is kept stationary for a predetermined time, the power supply 260 blocks power from the remote controller 200, thereby preventing waste of power. When a predetermined key of the remote controller 200 is manipulated, the power supply 260 may resume power supply.

The memory 270 may store a plurality of types of programs required for control or operation of the remote controller 200, or application data. When the remote controller 200 transmits and receives signals to and from the image display device 100 wirelessly through the RF module 221, the remote controller 200 and the image display device 100 perform signal transmission and reception in a predetermined frequency band. The controller 280 of the remote controller 200 may store information about the frequency band in which to wirelessly transmit and receive signals to and from the image display device 100 paired with the remote controller 200 in the memory 270 and refer to the information.

The memory 270 may store IR format key codes for controlling other electronic apparatuses as IR signals and store an IR format key database of a plurality of electronic apparatuses.

The controller 280 provides overall control to the remote controller 200. The controller 280 may transmit a signal corresponding to predetermined key manipulation on the user input portion 230 or a signal corresponding to an movement of the remote controller 200 sensed by the sensor portion 240 to the image display device 100 through the radio transceiver 220.

The controller 280 may control transmission of the received personal information to the image display apparatus 100 through the radio transceiver 220 by NFC with an electronic apparatus. In particular, if predetermined key input of the user input portion 230 is performed, the controller 280 may control transmission of the received personal information to the image display apparatus 100 through the radio transceiver 220.

In addition, the controller 280 may control transmission of the received personal information to an electronic apparatus other than the image display apparatus 100. At this time, different channels, frequencies or codes may be used with respect to electronic apparatuses. Such channels, frequencies or codes may be based on apparatus information or remote controllable channel information, frequency information or code information previously received from another electronic apparatus.

The user input interface 150 of the image display device 100 may have a radio transceiver 211 for wirelessly transmitting and receiving signals to and from the remote controller 200, and a coordinate calculator 215 for calculating the coordinates of the pointer corresponding to an operation of the remote controller 200.

The user input interface 150 may transmit and receive signals wirelessly to and from the remote controller 200 through an RF module 212. The user input interface 150 may also receive a signal from the remote controller 200 through an IR module 213 based on the IR communication standard.

The coordinate calculator 215 may calculate the coordinates (x, y) of the pointer to be displayed on the display 180 by correcting handshaking or errors from a signal corresponding to an operation of the remote controller 200 received through the radio transceiver 211.

A signal transmitted from the remote controller 200 to the image display apparatus 100 through the user input interface 150 is provided to the controller 180 of the image display device 100. The controller 180 may identify information about an operation of the remote controller 200 or key manipulation on the remote controller 200 from the signal received from the remote controller 200 and control the image display device 100 according to the information.

In another example, the remote controller 200 may calculate the coordinates of the pointer corresponding to the operation of the remote controller and output the coordinates to the user input interface 150 of the image display device 100. The user input interface 150 of the image display device 100 may then transmit information about the received coordinates to the controller 180 without correcting handshaking or errors.

As another example, the coordinate calculator 215 may not be included in the user input interface 150 but may be included in the controller 170.

Figure 6:
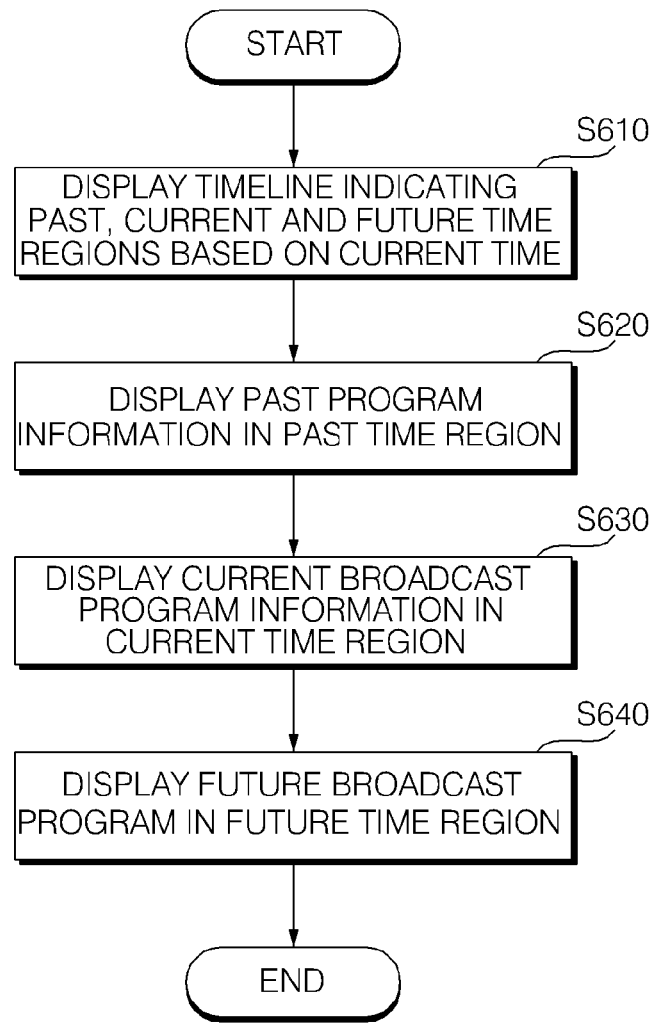
FIG. 6 is a flowchart illustrating a method for operating an image display apparatus according to an embodiment of the present invention.
Figure 7:
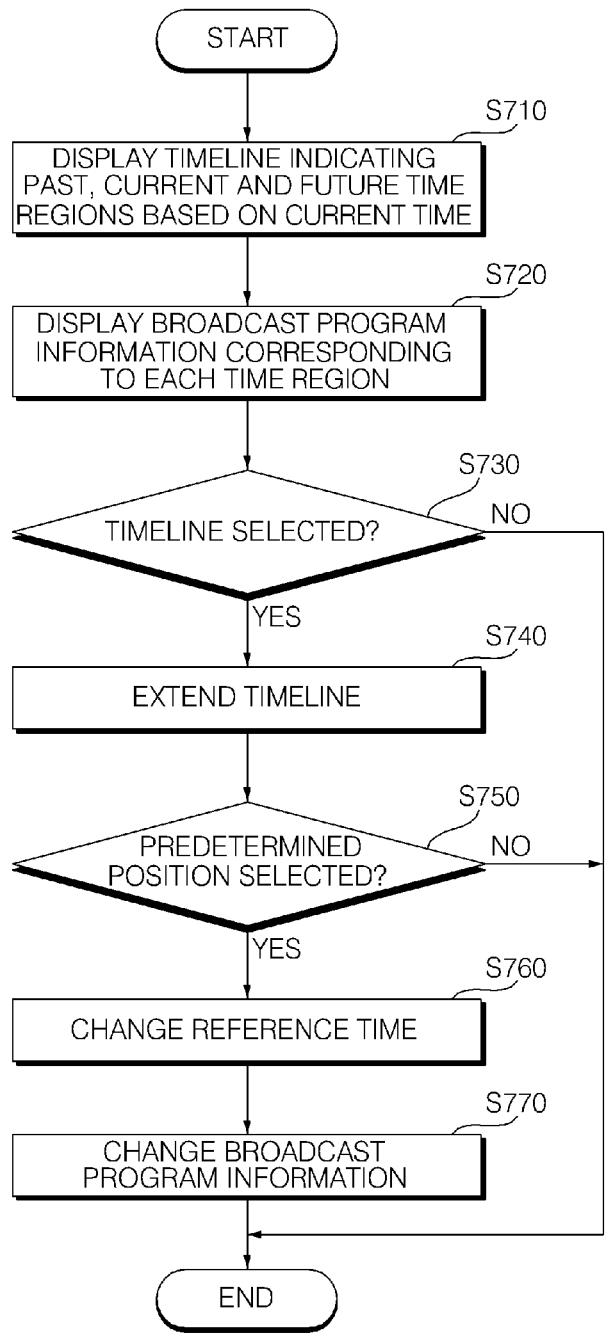
FIG. 7 is a flowchart illustrating a method for operating an image display apparatus according to an embodiment of the present invention.
Figure 21:
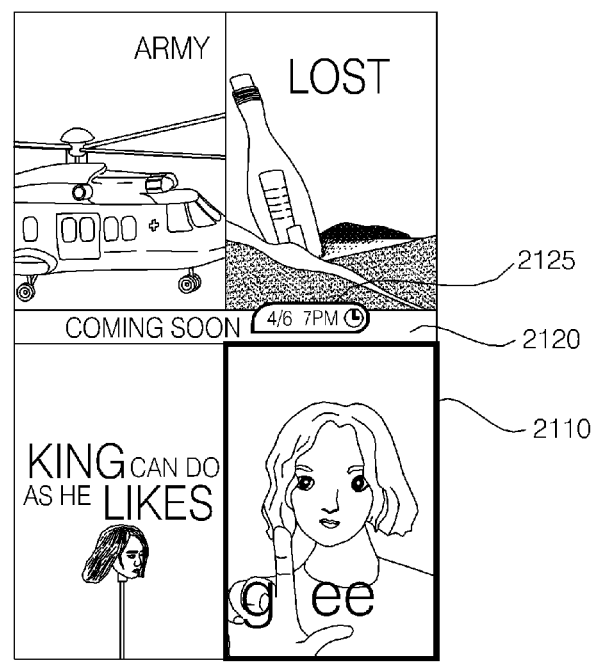
Figure 22:
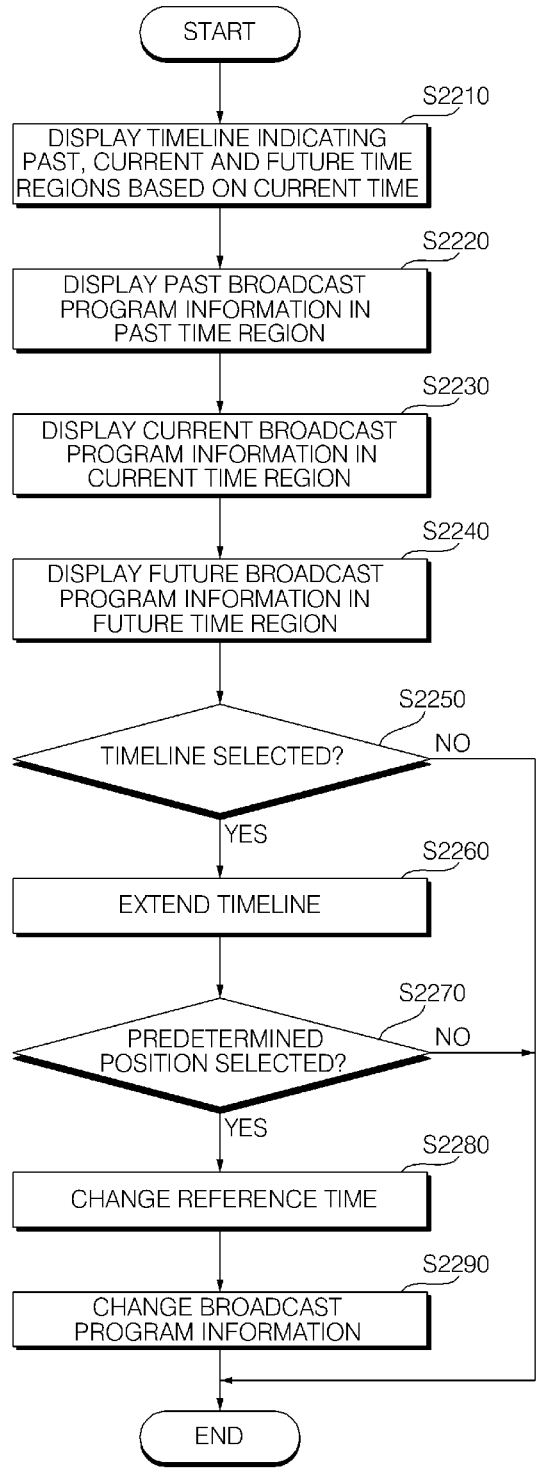
FIG. 22 is a flowchart illustrating a method for operating an image display apparatus according to an embodiment of the present invention.

FIGS. 6, 7 and 22 are flowcharts illustrating a method for operating an image display apparatus according to an embodiment of the present invention and FIGS. 8 to 21 are views referred to for describing the method for operating the image display apparatus according to the embodiment of the present invention.

Referring to FIG. 6, the method for operating the image display apparatus according to the embodiment of the present invention may include displaying a timeline indicating past, current and future time regions based on a current time (S610).

The timeline may be displayed on a bar type time axis according to a predetermined criterion or as an indicator for identifying a specific time region. Predetermined information may be time-sequentially displayed in a region divided by the timeline.

According to one embodiment of the present invention, the timeline may be provided such that a past time, a current time and a future time are displayed on one screen and predetermined information may be displayed in respective time regions based on time information.

In addition, the timeline may be divided into at least three time regions. For example, the timeline may be divided into a past time region, a current (now) time region, and a future (upcoming) time region based on a current time. The time information included in the timeline may be changed.

First information about past broadcast programs may be displayed in the past time region of the timeline (S620), second information about current broadcast programs may be displayed in the current time region (S630) and third information about broadcast programs to be broadcast in the future may be displayed in the future time region (S640).

Information about the broadcast program may include at least one of title, channel name, channel logo, representative image and broadcast time information.

According to one embodiment of the present invention, items included in the first information corresponding to the past time region may be displayed in a list type format and items included in the second information corresponding to the current time region and the third information corresponding to the future time region may be displayed in a thumbnail type format. In addition, the size of one item may vary according to region.

Since an EPG which is a conventional method of providing content information to a user displays information in the same format, it is difficult to identify content information.

As the time region displayed by the EPG is increased and the number of broadcast channels is rapidly increased, it is difficult to accurately and rapidly detect information about a desired time, broadcast channel and broadcast program of a user.

In order to enable a user to view information which is not displayed on a current screen, consecutive time regions should be sequentially output using a scroll operation or a page should be turned to check information on a screen different from a current screen.

In the present invention, broadcast content may be time-sequentially arranged along the timeline and visual information may be intuitively provided. That is, the time region may be divided into the past time region, the current time region and the future time region and content may be time-sequentially arranged in the respective regions.

In addition, the user may have greater interest in current and future broadcast programs than past broadcast programs and prefer to view content such as sporting events in real time.

Accordingly, in the present invention, information may be displayed in a list type format in the past time region and a thumbnail image corresponding to information may be displayed in the current and future time regions, such that the user can easily recognize the information.

In the list type format, information composed of text may be arranged in the form of a list. In the thumbnail type format, information composed of a thumbnail image may be arranged according to layout. The item included in the information does not include only text or thumbnail images.

For example, displaying predetermined information in a list type format may include not only displaying information composed of text in a list type format but also displaying graphic objects such as channel logs and icons.

In addition, displaying predetermined information in a thumbnail type format may include not only displaying predetermined information composed of only thumbnail images but also displaying brief text or graphic objects, such as broadcast channel name or program title, along with thumbnail images.

Information about the broadcast programs of the future time region may be based on EPG information. The EPG information may include broadcast program titles, broadcast channels, broadcast time, broadcast program categories, the number of times of broadcasting, actor/actress names, brief information of broadcast programs, etc.

In addition, a thumbnail image of a current broadcast program and broadcast information of a future broadcast program may be time-sequentially aligned and displayed. Accordingly, the user may intuitively confirm the time order of programs and efficiently manage a viewing time.

The thumbnail images included in the current and future time regions may be images extracted from programs which are currently being broadcast or were broadcast in the past, pre-stored images, information received from a content provider or a broadcast station or images searched for based on the EPG information.

In the present invention, broadcast content is time-sequentially arranged along the timeline and visual information is intuitively provided. In addition, since the present invention is equally applied to a TV guide screen and a content screen requiring time information, it is possible to provide a consistent user experience.

The operating method according to one embodiment of the present invention may further include receiving input for selecting the timeline and extending the timeline to include time information selectable by the user. Accordingly, the timeline may function not only as a time axis representing a time region corresponding to content information but also as a menu for controlling the time region.

If input for selecting a predetermined position in the extended timeline is received, a reference time may be changed in correspondence with the selected predetermined position and items included in the first to third information may be changed based on change in reference time. That is, if the reference time is changed using the timeline extended by the user, content information may be rearranged according to the changed reference time.

Accordingly, the user does not sequentially confirm information while changing consecutive time regions via a scroll operation but selects a specific time region using the timeline so as to easily confirm information about the time region.

Alternatively, if the user focuses on a predetermined position of the timeline using a pointer or moves the pointer on the timeline, content may be changed, realigned and displayed. That is, only information may be sorted and displayed according to a region or part, in which the pointer is located, even in a state in which the reference time is fixed.

Various UI scenes using the timeline according to the embodiment of the present invention will be described in detail below with reference to FIGS. 8 to 21.

Referring to FIG. 7, the method for operating the image display apparatus according to the embodiment of the present invention may include displaying the timeline indicating the past, current and future time regions based on the current time on the display 180 (S710) and display information about broadcast programs corresponding to the past, current and future time regions (S720).

That is, the timeline for dividing the past, current and future time regions based on the current time may be displayed, information about past broadcast programs may be displayed in the past time region, information about current broadcast programs may be displayed in the current time region, and information about broadcast programs which are not yet broadcast may be displayed in the future time region.

Thereafter, if user input for selecting the timeline is received (S730), the timeline is extended to include time information selectable by the user (S740).

Accordingly, the user may select a position corresponding to a certain time region or a specific time from the extended timeline representing several time regions.

The user may select the timeline using the remote controller described with reference to FIGS. 3 to 5.

Thereafter, if user input for selecting a predetermined position in the extended timeline is received (S750), the reference time may be changed in correspondence with the selected position (S760) and the first to third information may be changed based on change in reference time (S770).

That is, items included in the information about the regions may be changed, rearranged and displayed according to change in reference time. For example, the changed reference time may be set to a current time, information about broadcast programs broadcast before the changed reference time may be displayed in the past time region, information about broadcast programs which are being broadcast at the changed reference time may be displayed in the current time region, and information about broadcast programs to be broadcast after the changed reference time may be displayed in the future time region.

Hereinafter, various UI scenes using the timeline according to the embodiment of the present invention will be described in detail below with reference to FIGS. 8 to 21.

Figure 8:
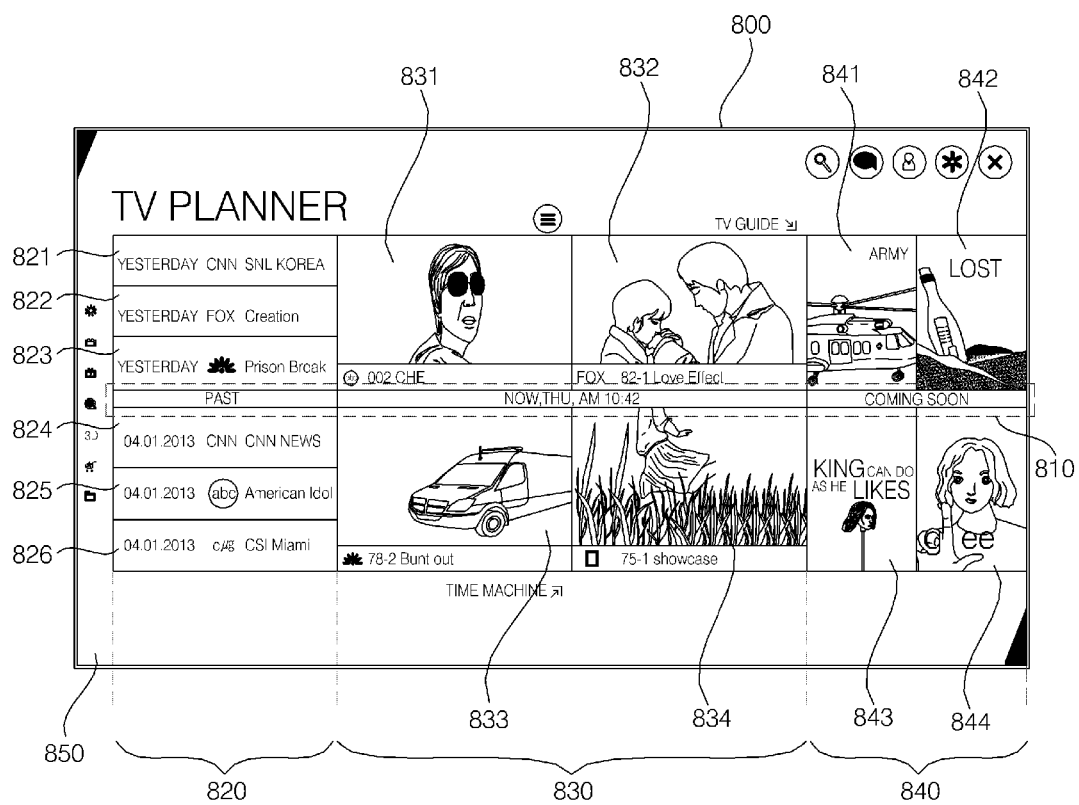
FIGS. 8 to 21 are views referred to for describing the method for operating the image display apparatus according to the embodiment of the present invention.

FIG. 8 shows an example of a content information display screen according to an embodiment of the present invention and, more particularly, a TV broadcast information screen.

Referring to FIG. 8, the content information display screen 800 may include a timeline for dividing a plurality of time regions such that content information is classified according to a predetermined time range.

The timeline 810 may include a past time region 820 representing first information about broadcast programs which were broadcast before a current time, a current time region 830 representing second information about broadcast programs which are currently being broadcast and a future time region 840 representing third information about broadcast programs to be broadcast in the future, as regions in which content information is arranged.

In FIG. 8, "PAST" is displayed in the timeline corresponding to the past time region 820, "NOW" is displayed in the timeline corresponding to the current time region 830 and "UPCOMING" is displayed in the timeline corresponding to the future time region 840.

Current date and time information corresponding to the reference time may be further displayed in the timeline corresponding to the current time region 830.

As shown in FIG. 8, a plurality of items 821, 822, 823, 824, 825 and 826 displayed in the past time region 820 may be arranged in a list type format.

The plurality of items 821, 822, 823, 824, 825 and 826 included in the first information may include at least broadcast program titles and may further include broadcast date and/or time information, broadcast channel information, etc.

Among the plurality of items 821, 822, 823, 824, 825 and 826, "YESTERDAY" may be displayed rather than the date as the date information of the items 821, 822 and 823 representing information about broadcast programs which were broadcast yesterday, in order to enable the user to more easily perceive the date information.

The plurality of items 821, 822, 823, 824, 825 and 826 included in the first information may be information about automatically recorded broadcast programs or information about broadcast programs recorded by user recording settings.

According to the embodiment, the automatically recorded broadcast programs may be automatically deleted after a predetermined period.

Since the interest of the user in a past broadcast program or an automatically recorded broadcast program may be diminished and the user is aware of the broadcast program directly recorded by the user, these broadcast programs may be displayed in the list type format composed of text.

Accordingly, it is possible to efficiently utilize a space within which information is arranged and to aid the user in easily recognizing content information.

As shown in FIG. 8, a plurality of items 831, 832, 833 and 834 displayed in the current time region 830 may be arranged in a thumbnail type format. FIG. 8 shows an example of displaying thumbnail images of four broadcast programs.

The plurality of items 831, 832, 833 and 834 included in the second information may include titles and broadcast channel information in addition to the thumbnail images of the broadcast programs which are currently being broadcast.

Information about the broadcast programs included in the second information may be information about broadcast programs most recently viewed by the user or most popular broadcast programs.

For example, the broadcast programs displayed in the second information may be randomly selected by the controller 170, broadcast programs starting at a time closest to a current time may be selected, and most popular broadcast programs or broadcast programs most recently viewed by the user may be selected.

As shown in FIG. 8, a plurality of items 841, 842, 843 and 844 displayed in the future time region 840 may be arranged in a thumbnail type format. The plurality of items 841, 842, 843 and 844 included in the third information is information about broadcast programs recommended at the current time.

The plurality of items 841, 842, 843 and 844 included in the third information may be based on EPG data or data or EPG data pre-stored in the image display apparatus or data downloaded via the Internet.

The information about the broadcast programs included in the first information or the third information may be associated with the broadcast programs included in the second information. That is, content similar to content displayed in the current time region may be displayed in another region to be recommended to the user.

For example, information about broadcast program equal or similar to content displayed as the information about the current broadcast programs in terms of genre, series, producer or cast may be displayed in the past time region or the future time region.

According to the embodiment of the present invention, content information may be arranged on the screen along the timeline from the past to the future such that the user can perceive time information and content at a glance. In addition, very much information may not be incompactly arranged but an appropriate number of pieces of visually differentiated information may be displayed, thereby aiding the user in easily detecting desired information.

The content information display screen 800 may further include a menu region in which menu items are provided. The user may select a predetermined menu item to change the screen to another screen or to perform another function.

In consideration of system load and graphic effect, the content broadcast information items displayed in the past, current and future time regions may be sequentially displayed from the past to the future.

Figure 9A:
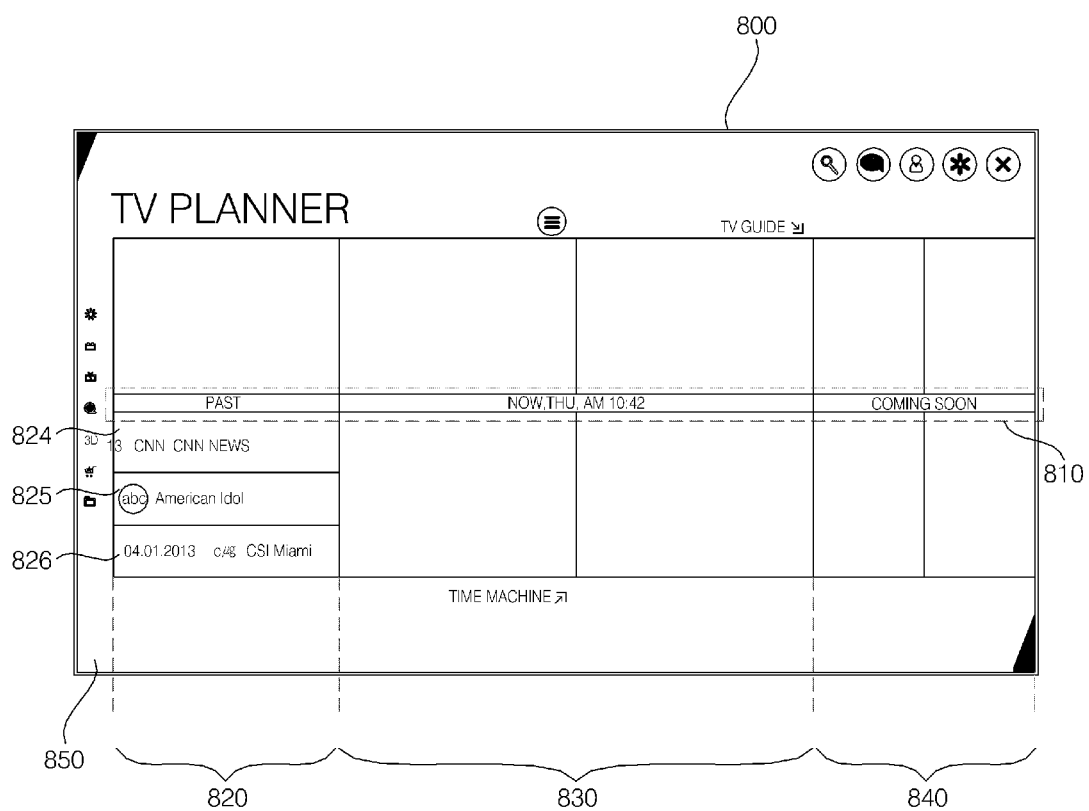
Figure 9B:
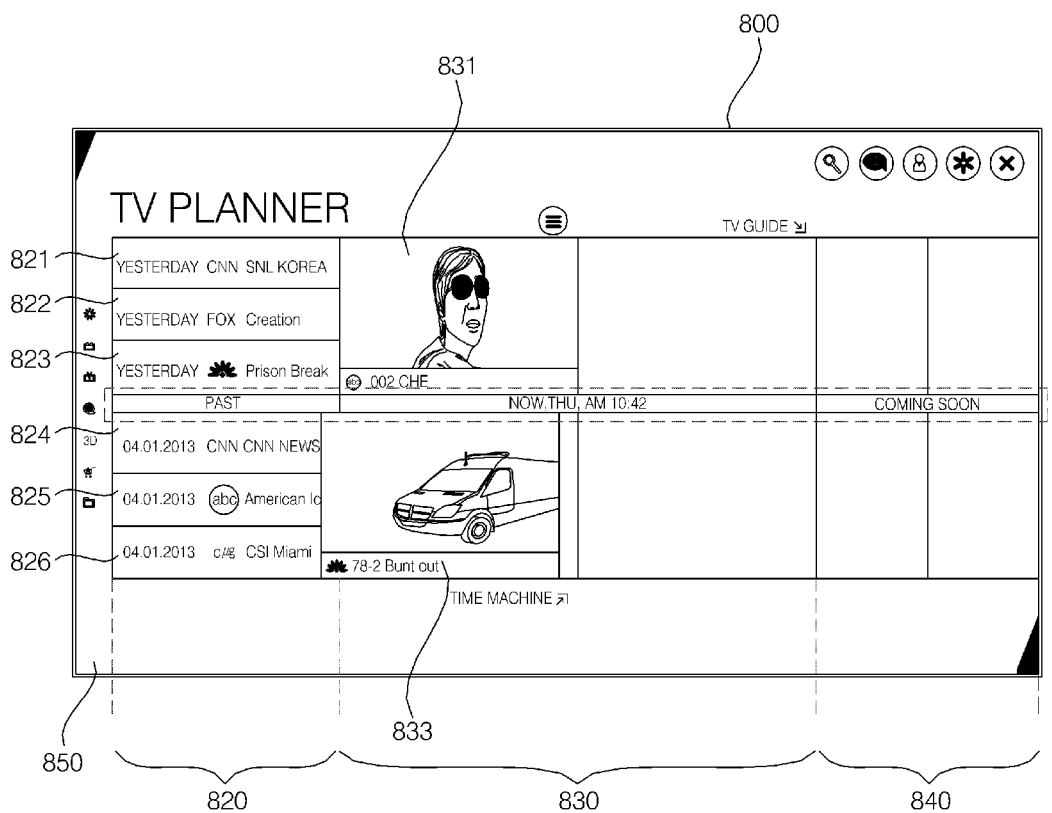
Figure 9C:
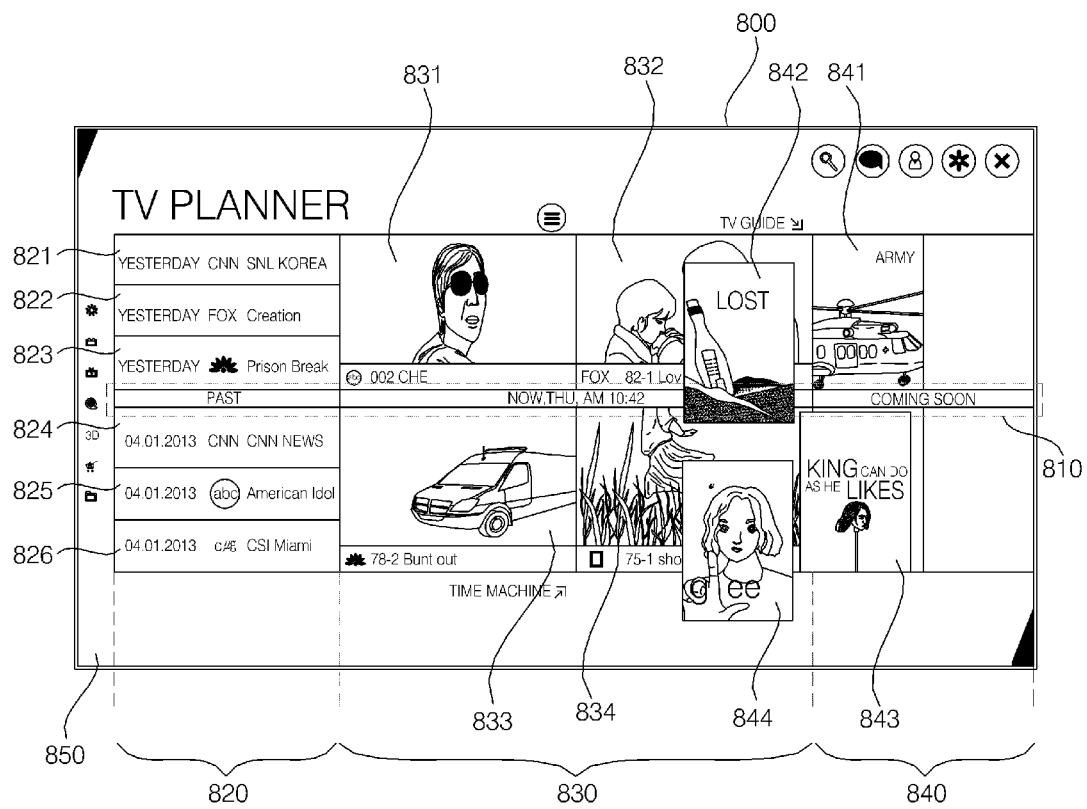

Referring to FIGS. 9a to 9c, first, predetermined items 824, 825 and 826 of the first information may be displayed in the past time region 820 and the remaining information items 821, 822 and 823 may be sequentially displayed in the past time region 820.

Thereafter, the predetermined items 831 and 833 of the second information may be displayed in the current time region 830 and the remaining information items 832 and 834 may be sequentially displayed in the current time region 830. In addition, the predetermined items 841 and 843 of the third information may be displayed in the future time region 840 and the remaining information items 842 and 844 may be sequentially displayed in the future time region 840.

As shown in FIGS. 9a to 9c, when an initial screen for viewing content information is generated, arrangement of content along the timeline may be represented by motion to be recognized by the user.

Thereafter, if user input for selecting the timeline is received, the controller 170 may control extension of the timeline to include the time information selectable by the user.

Figure 10:
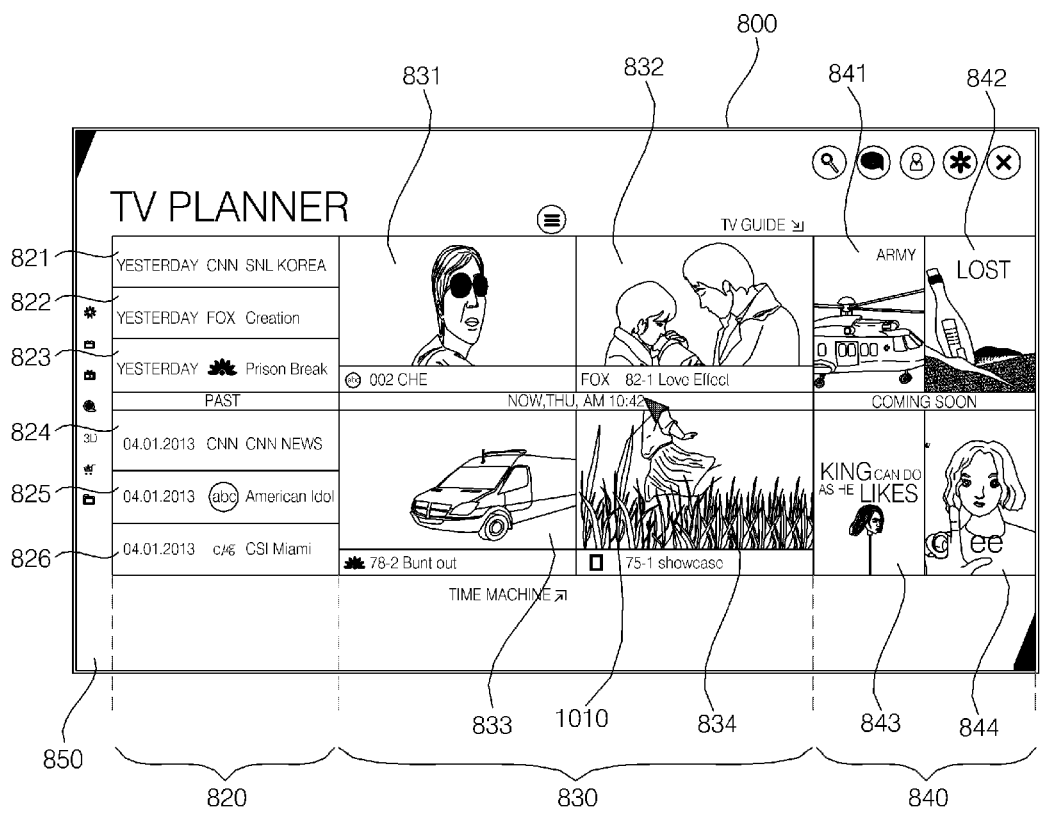
Figure 11A:
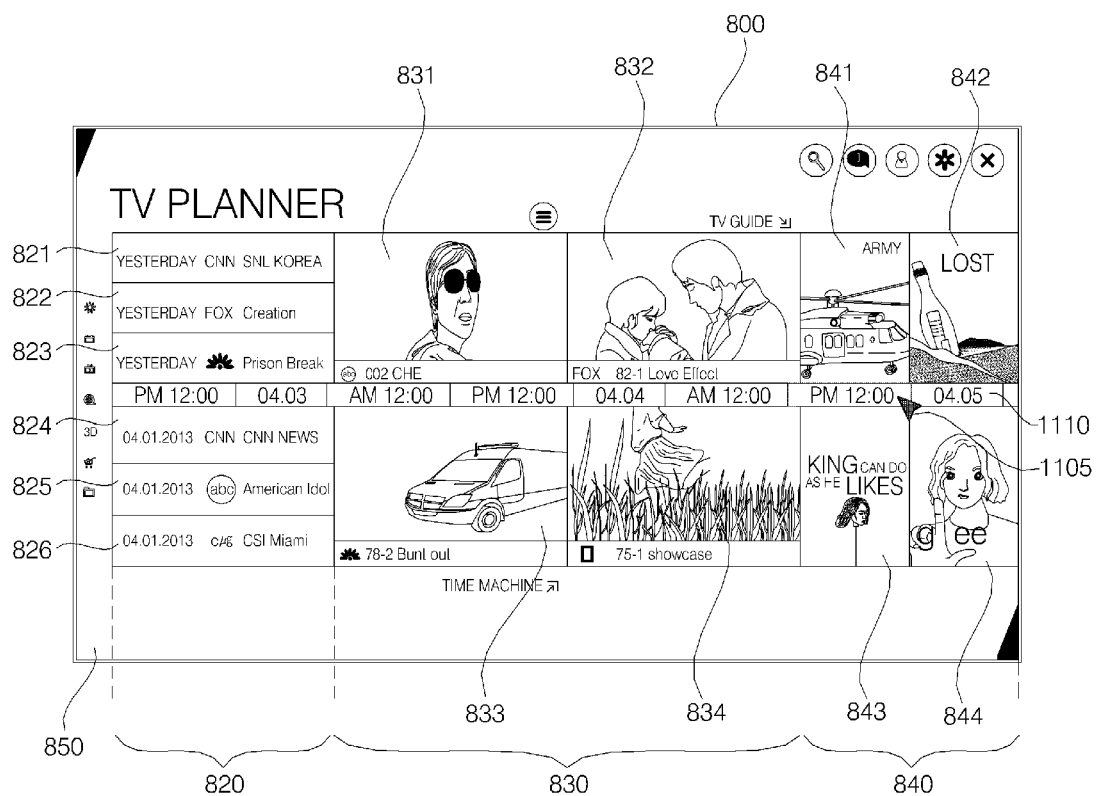

For example, as shown in FIG. 10, if the user selects the timeline after a pointer 1010 displayed in correspondence with movement of the remote controller is moved, as shown in FIG. 11a, the timeline may be extended and selectable time information may be provided in the extended timeline 1110. Thus, the user may select a position corresponding to any time region or specific time in the extended timeline representing several time regions.

The step of extending the timeline may be change the scale of the timeline. The scale of the timeline may be changed to be divided into the past, the current and the future at a predetermined date or time interval.

Although the extended timeline 1110 is displayed at a time interval of 12 hours in FIG. 11a, the present invention is not limited thereto.

In the step of extending the timeline, the size of the timeline may be increased upward or downward. Accordingly, the user may easily recognize the time information displayed in the extended timeline.

In the step of extending the timeline, a region corresponding to a position of input for selecting the timeline among the past, current and future time regions of the timeline may be extended and displayed. Referring to FIGS. 10 and 11a, since the pointer 1010 is moved to the position corresponding to the current time region of the timeline 810, the timeline may be extended based on the current time.

Thereafter, if user input for selecting a predetermined position or time in the extended timeline is received, the reference time may be changed in correspondence with the selected position and the first to third information displayed in the respective regions may be changed based on change in reference time.

In the step of changing the reference time, the timeline may be changed such that the past, current and future time regions are displayed based on the changed reference time and, in the step of changing the information, information about the broadcast programs corresponding to the past, current and future time regions may be displayed based on the changed reference time.

If the user selects a desired time region from the timeline 1110 using the pointer 1105, content is rearranged according to the selected time region. That is, the items included in the information about each region may be changed, rearranged and displayed according to change in reference time. By setting the changed reference time to conform to the current time of the initial screen, a UI having the same format may be consistently applied.

Figure 11B:
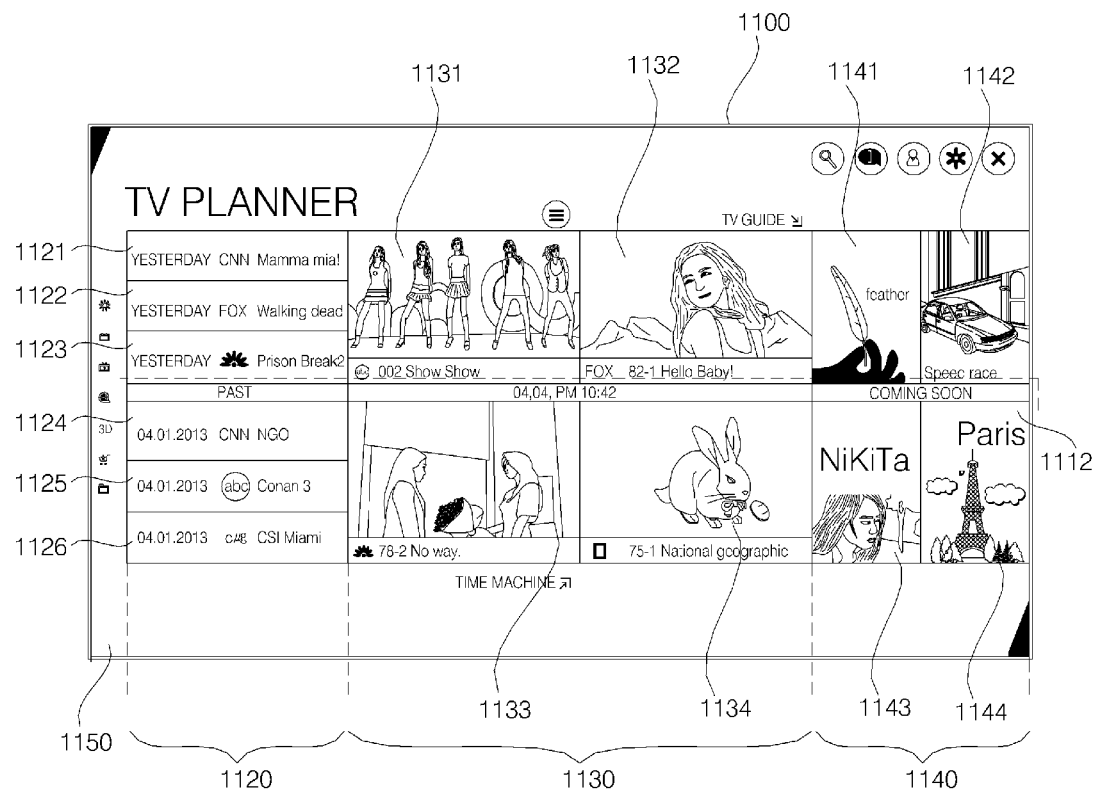

For example, referring to FIG. 11b, information 1121, 1122, 1123, 1124, 1125 and 1126 about the broadcast programs which were broadcast before the changed reference time may be displayed in the past time region 1120, information 1131, 1132, 1133 and 1134 about the broadcast programs which are being broadcast at the changed reference time may be displayed in the current time region 1130, and information 1141, 1142, 1143 and 1144 about the broadcast programs to be broadcast in the future may be displayed in the future time region 1140.

According to the embodiment of the present invention, it is possible to provide a new interface for selecting a time region using the timeline on the screen in which a current time is set as a reference time.

Although the embodiment of extending the timeline when selecting the timeline is described herein, the timeline may be extended when focusing on the timeline. That is, selection input of the above-described embodiment may be replaced with focusing input.

In this case, if the user focuses on the timeline, the timeline region may be extended and a desired time region may be selected. Accordingly, content may be flexibly rearranged.

According to the embodiment, if the user focuses in on a predetermined position of the timeline using the pointer 1105 or moves the pointer 1105 on the timeline, content may be changed and realigned and displayed.

That is, even when the user does not finally select a specific time region on the extended timeline, information may be changed and displayed before the reference time is finally changed and information about various time regions may be rapidly confirmed while moving the pointer 1105 using the remote controller 200.

For example, even when the pointer 1105 is moved on the timeline 1110 or an OK key is not pressed in FIG. 11, if a focusing state is maintained, content information may be changed and displayed.

Figure 11C:
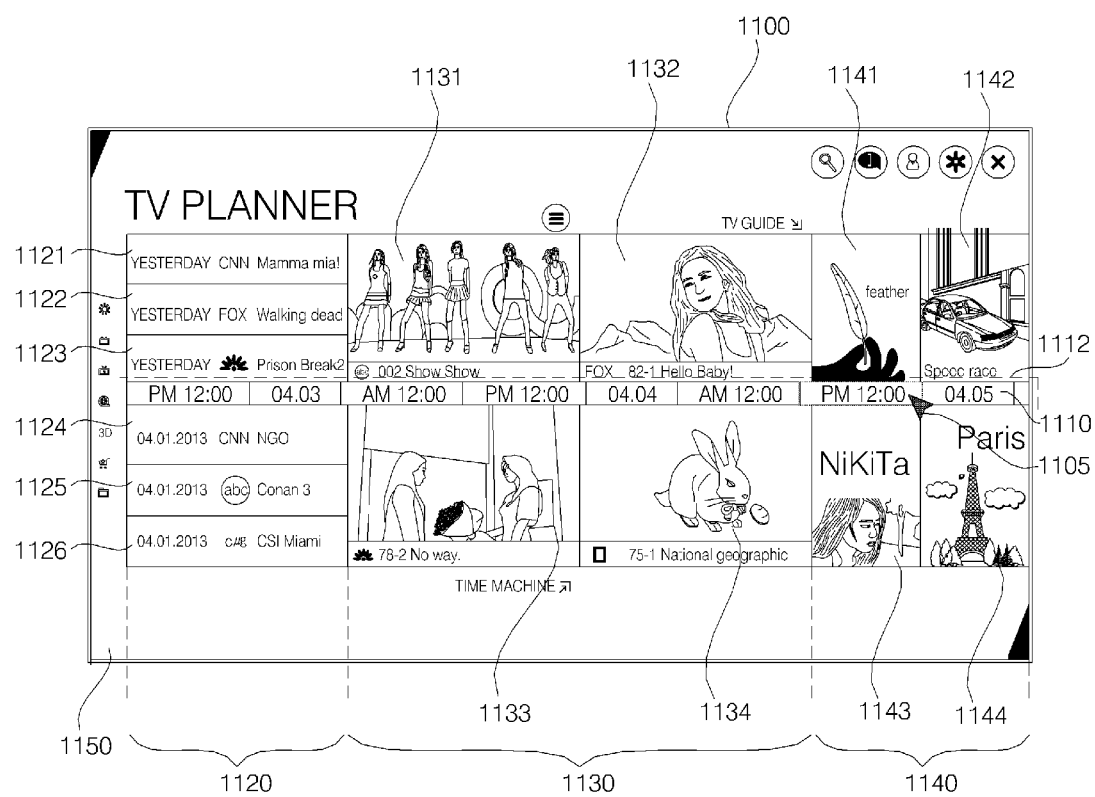

Referring to FIG. 11c, if a predetermined position on the timeline 1110 is focused in on using the pointer 1105, information 1121, 1122, 1123, 1124, 1125 and 1126 about the broadcast programs which were broadcast before the time corresponding to the pointer 1105 on the timeline 1110 may be displayed in the past time region 1120 while the timeline 1110 is maintained in the extended state.

In addition, the information 1131, 1132, 1133 and 1134 about the broadcast programs which are being broadcast at the time corresponding to the position of the pointer 1105 on the timeline 1110 may be displayed in the current time region 1130 and the information 1141, 1142, 1143 and 1144 about the broadcast programs to be broadcast after the time corresponding to the position of the pointer 1105 on the timeline 1110 may be displayed in the future time region 1140.

If the user selects the current position, the screen may be switched to the screen shown in FIG. 11b.

If the user moves the pointer 1105 in a predetermined direction on the screen of FIG. 11c, content information may be changed again and respectively displayed in the past time region 1120, the current time region 1130 and the future time region 1140, according to movement of the pointer 1105.

The user may finally select a time region including desired information or detailed information while confirming a variety of information using the pointer 1105 and the timeline 1110.

In another embodiment, even in the case of using focusing, only information based on an initially selected position of the timeline 1110 may be changed. In FIG. 11a, if the predetermined position on the timeline 1110 is focused in on using the pointer 1105, a plurality of items 831, 832, 833 and 834 displayed in the current time region 830 may be changed.

Figure 11D:
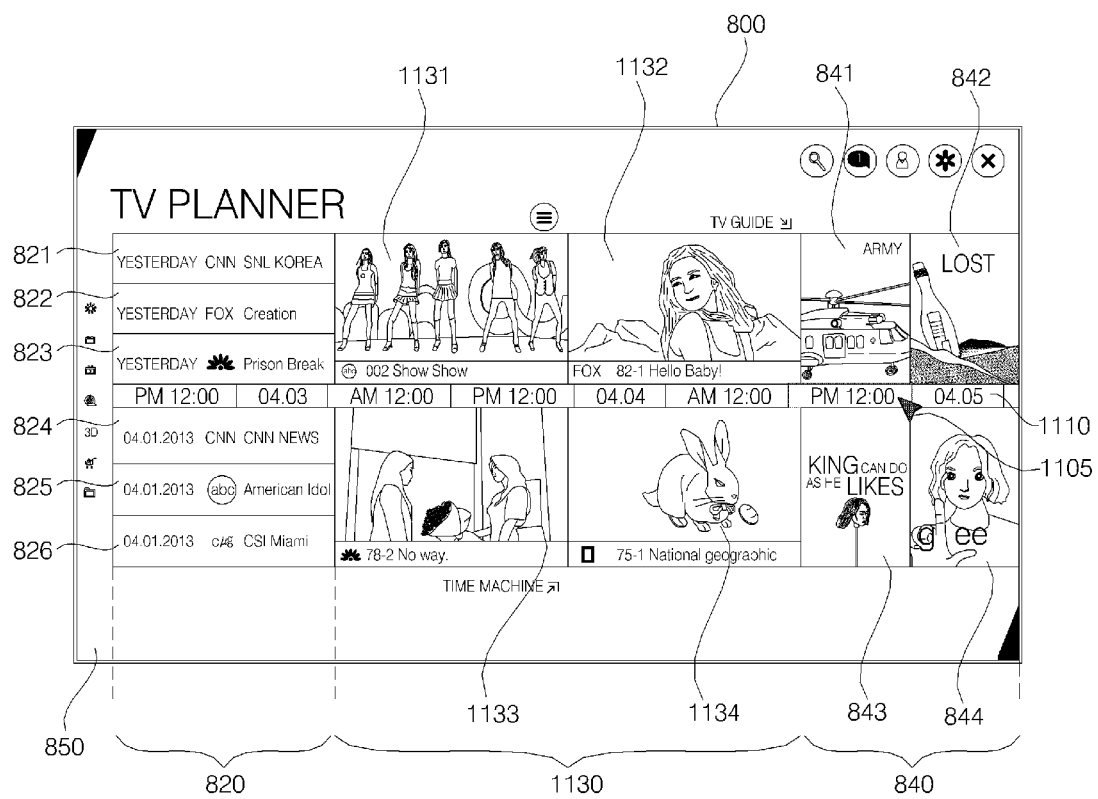

Referring to FIG. 11d, a plurality of changed content information items 1131, 1132, 1133 and 1134 is displayed in the current time region 830.

If a predetermined time region on the timeline is selected or focused in on using the pointer, time information corresponding to the position may be displayed. Display of the time information will be described below with reference to FIGS. 19 to 21.

Other embodiments will be described with reference to FIGS. 12a to 12c.

In the embodiment shown in FIGS. 11a to 11d, if the user selects (or focuses in on) the timeline, the timeline is extended. However, the content of the displayed information is not changed until the user selects a predetermined position from the extended timeline.

However, in the step of extending the timeline, a region corresponding to a position of input for selecting the timeline among the past, current and future time regions of the timeline may be extended and displayed and the other regions may be deleted. In this case, among the first to third information, information corresponding to the extended region may be extended and displayed and the remaining information may be deleted.

For example, the information about the region corresponding to the position selected by the user may be extended to the deleted other regions.

Figure 12A:
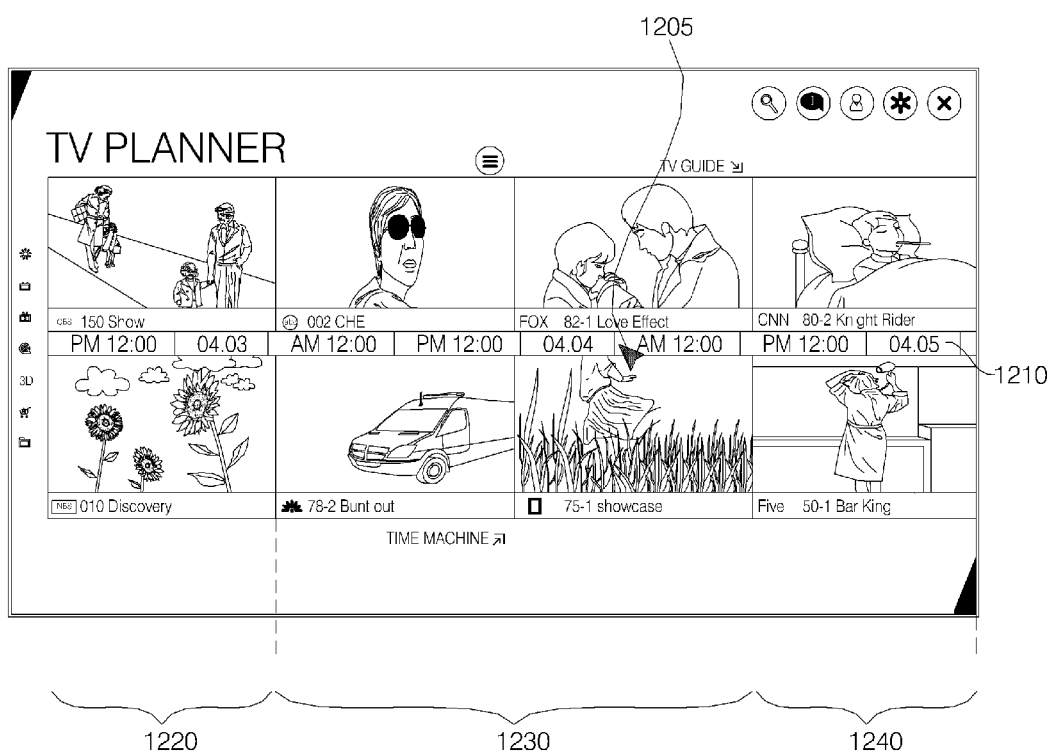

As shown in FIG. 12a, if the user selects (or focuses on) the timeline, content or form of the broadcast program information displayed in the past time region 1220, the current time region 1230 and the future time region 1240 may be changed while the timeline is extended.

Figure 12B:
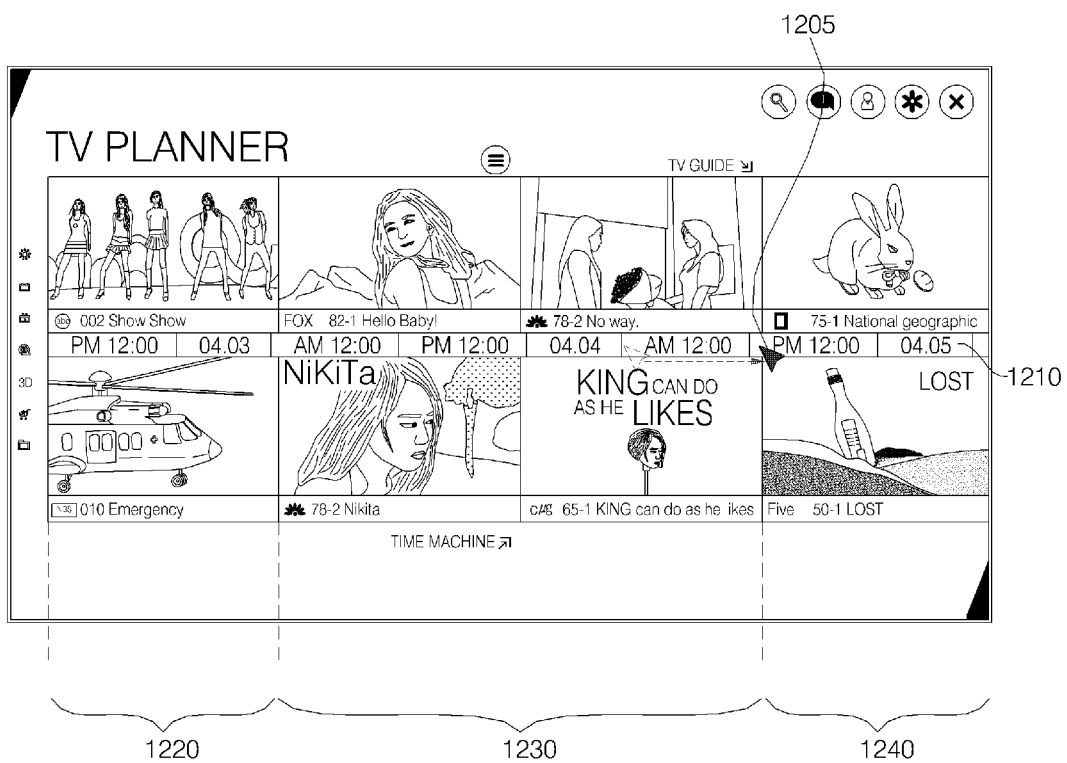

Thereafter, as shown in FIG. 12b, if the user moves the pointer 1205 to the right on the timeline 1210, thumbnails may be changed to information about the other time regions according to movement of the pointer 1205. In addition, the information may be gradually changed according to movement of the pointer 1205 until the user finally selects information.

Figure 12C:
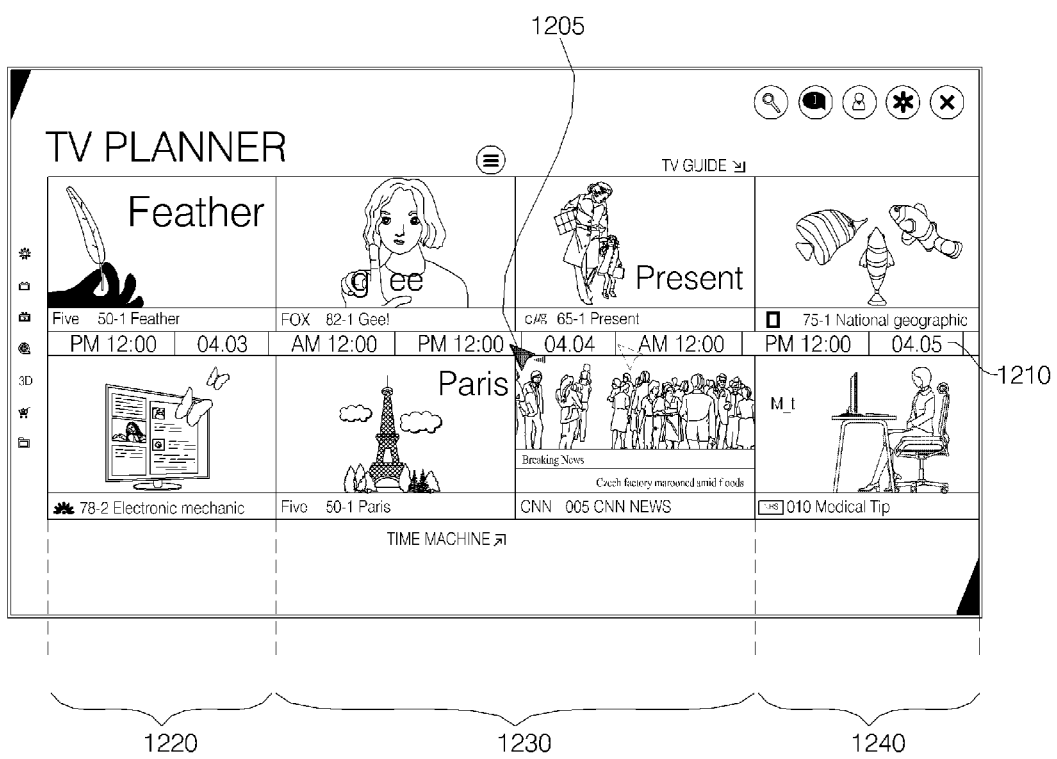

Conversely, as shown in FIG. 12c, even when the user moves the pointer 1205 to the left on the timeline 1210, content information based on the time region corresponding to movement of the pointer 1205 may be changed and displayed.

Figure 13:
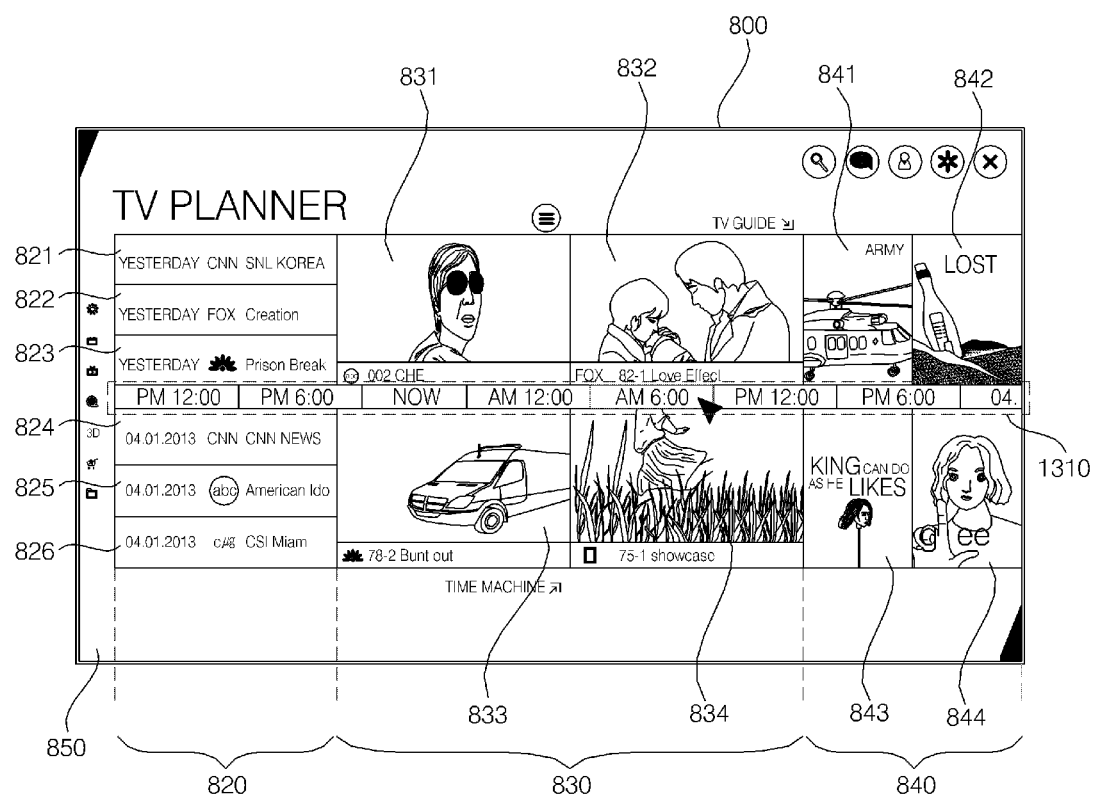

Although the extended timeline 1110 is displayed at a time interval of 12 hours in FIG. 11a, the present invention is not limited thereto. For example, as shown in FIG. 13, the extended timeline 1310 may be displayed at a time interval of 6 hours.

Even when using the timeline, the time interval included in the time information selectable by the user may be changed. For example, the time interval included in the time information selectable by the user may be changed by wheel or predetermined key input of the remote controller.

Figure 14:
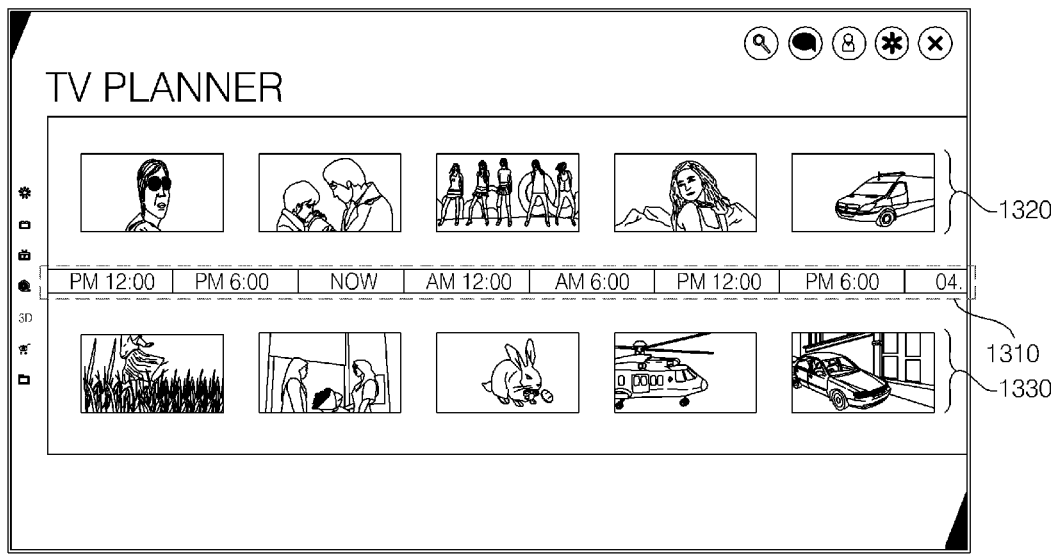
Figure 15:
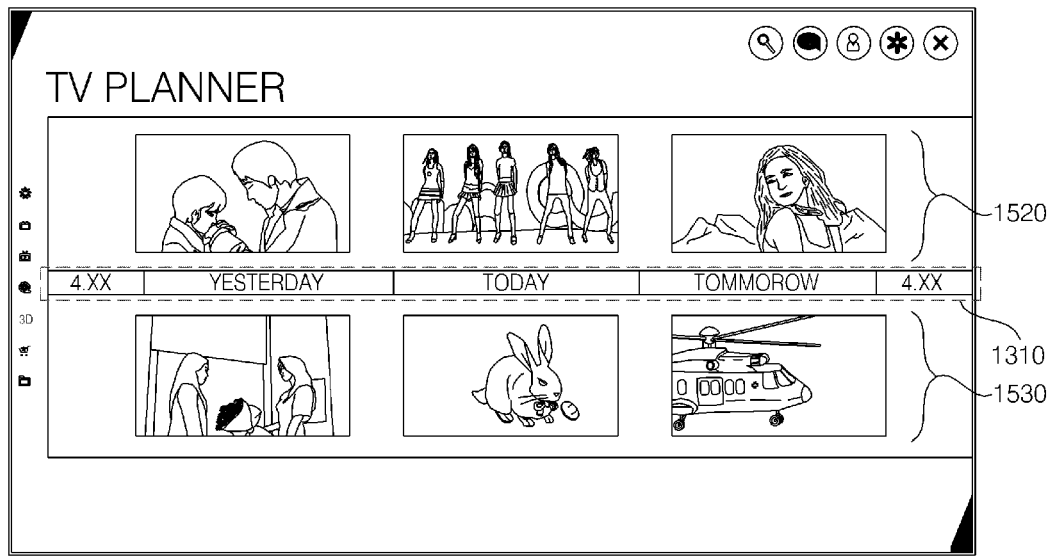

Referring to FIGS. 14 and 15, the extended timeline 1310 may be displayed and five thumbnail images corresponding to information about the broadcast programs may be displayed in each of upper and lower regions 1310 and 1330 of the timeline 1310.

The time interval may be increased if the user moves the wheel 291 of the remote controller 200 in a first direction and may be decreased if the user moves the wheel 291 of the remote controller 200 in a second direction. Alternatively, a predetermined key such as a channel up/down key may be used.

Referring to FIG. 15, the time interval of the timeline 1510 may be changed from 6 hours to one day according to user's manipulation of the wheel 291 or the predetermined key.

The number of pieces of displayed information or a display size may be changed according to change in time interval. Referring to FIG. 15, the sizes of the thumbnail images displayed in the upper and lower regions 1520 and 1530 are increased and the number of thumbnail images is decreased, as the time interval is increased. In contrast, as the time interval is increased, the number of thumbnail images may be increased.

In the above-described embodiments, an example in which the timeline is arranged along the center line of the screen and content information is provided above and below the timeline has been described. However, the position of the timeline may be changed to another position and the user may change the display position of the timeline even when utilizing the content information viewing screen and the timeline.

The display part may be changed according to the display position of the timeline.

In addition, the content information may be changed and displayed according to the display position of the timeline and various combinations of content information may be displayed. Accordingly, the user can intuitively confirm information.

For example, when the display position of the timeline is an upper region of the display 180, past content information may be displayed below the timeline and, when the display position of the timeline is a lower region of the display 180, future content information may be displayed above the timeline.

On the contrary, if the display position of the timeline is an upper region of the display 180, future content information may be displayed.

In addition, displayed information may be set to be changed according to the display position of the timeline. If the user drags the timeline using the remote controller 200 in a predetermined direction, the display part of the displayed content information may be gradually changed based on the current position of the timeline and/or the drag direction.

The method for operating the image display apparatus according to one embodiment of the present invention may further include receiving input for pressing a wheel or predetermined key, e.g., an OK key, of the remote controller for a reference time or more and changing a display type of items included in any one of the second information or the third information from the thumbnail type to the list type.

Figure 16:
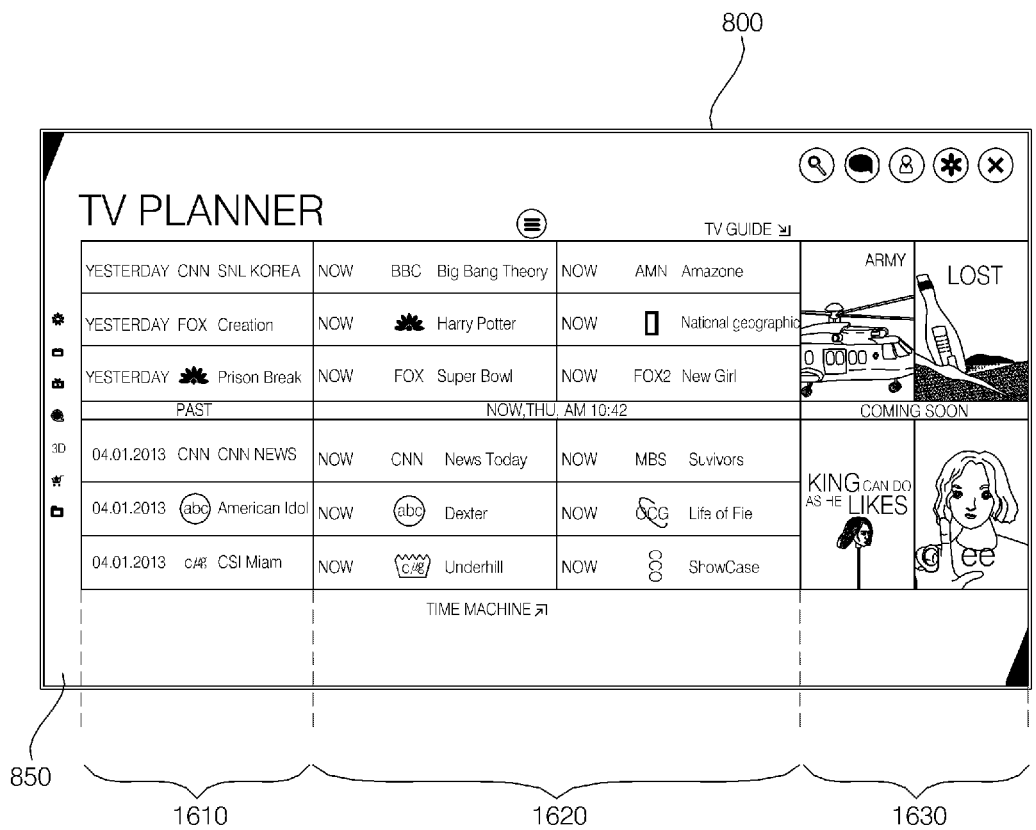
Figure 18:
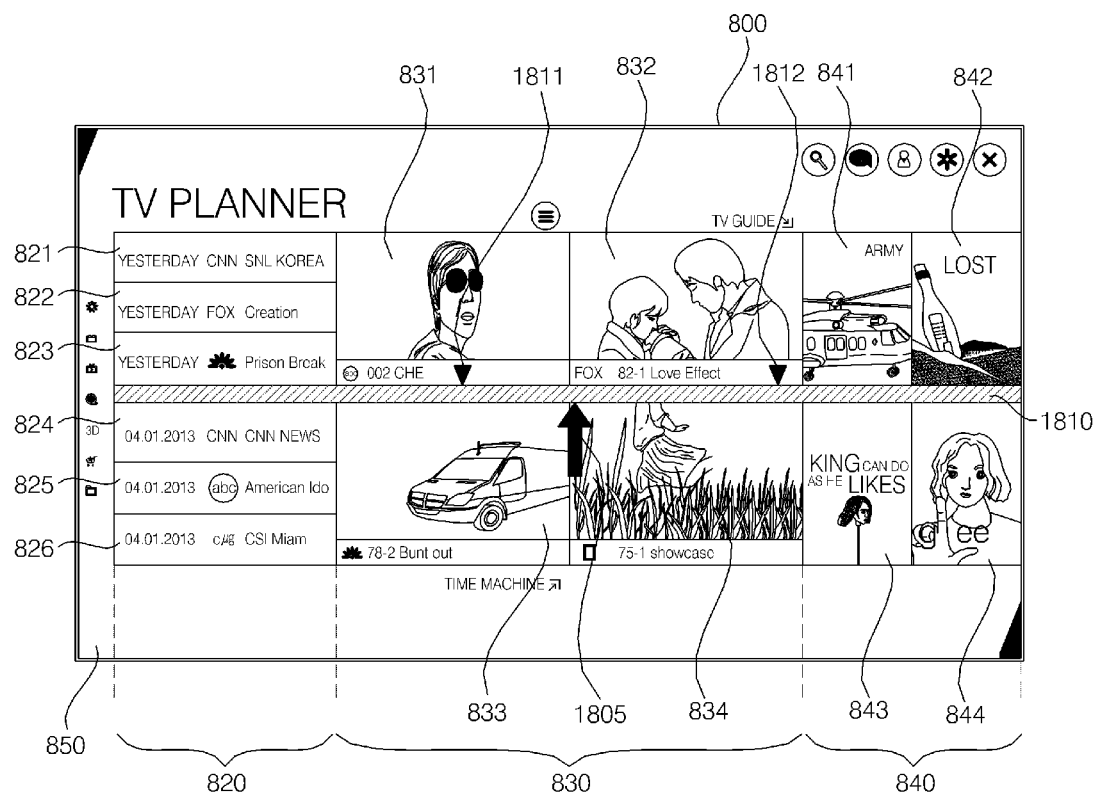

FIG. 16 shows an example of displaying not only first information items displayed in the past time region 1610 but also second information items displayed in the current time region 1620 in a list type format in the embodiment of FIG. 18.

Figure 17:
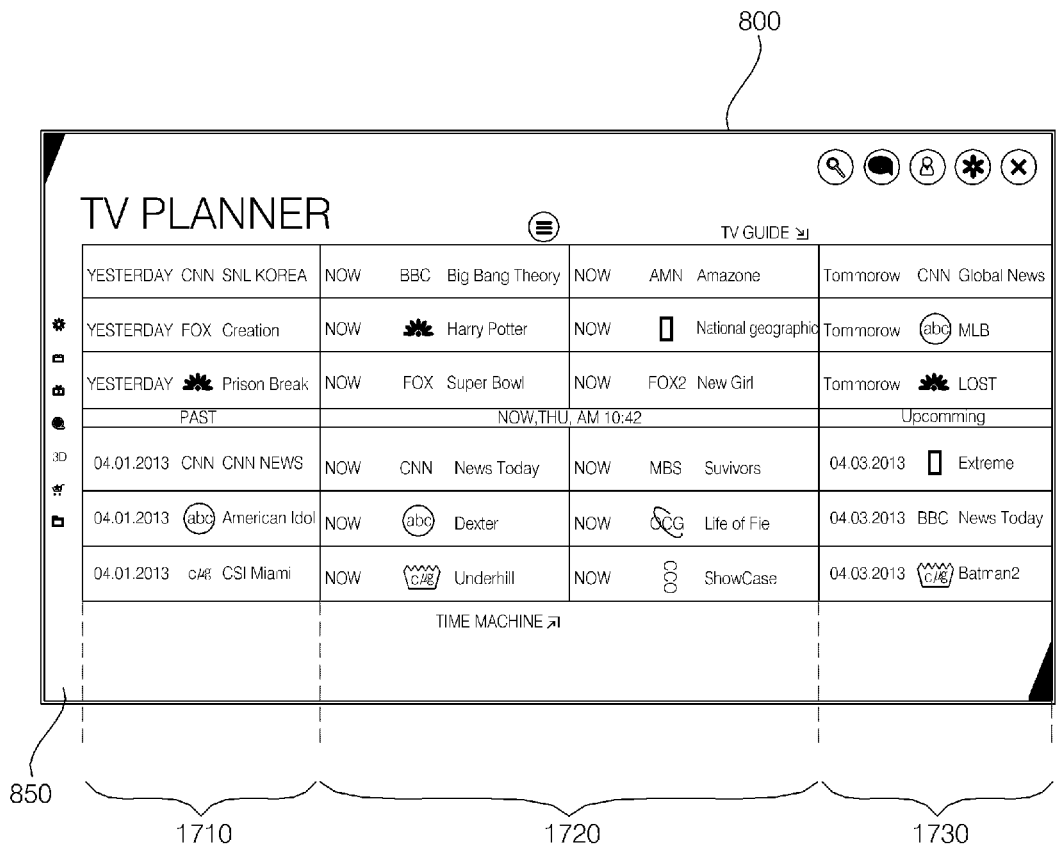

FIG. 17 shows an example of displaying not only first information items displayed in the past time region 1710 but also second information items displayed in the current time region 1720 and third information items displayed in the future time region 1730 in a list type format in the embodiment of FIG. 8.

Referring to FIG. 18, graphic indicators 1811 and 1812 may be further displayed on the timeline 1810. The graphic indicators 1811 and 1812 may indicate a maximum value and a minimum value of a range within which a reference time is changed, a screen is changed or some information is changed, if the pointer 1805 is turned over.

In particular, this may be more efficient in the embodiment in which content information may be changed and displayed only by the focusing operation using the pointer.

The method for operating the image display apparatus according to one embodiment of the present invention may further include receiving input for selecting or focusing on any one of items included in the first to third information and displaying time information associated with the selected or focused item.

In this case, the time information may be a recording generation time in case of the item included in the first information and may be broadcast start time information in case of the item included in the second information and the third information.

According to the present invention, a content sorting method using the graphic element such as the timeline on the screen is newly proposed.

In addition, the user may be informed of a time when content is generated or a time when content is broadcast before the user finally selects specific content by focusing or roll-over, thereby enhancing user experience.

The time information may be displayed on the timeline along with a watch-shaped icon. According to the embodiment of the present invention, content may be time-sequentially arranged along the timeline to be visually differentiated and intuitive time information may be provided to the user. In addition, the time information of the content selected by the user may be represented by an analog watch using the time, thereby satisfying sensitivity of the user.

Figure 19:
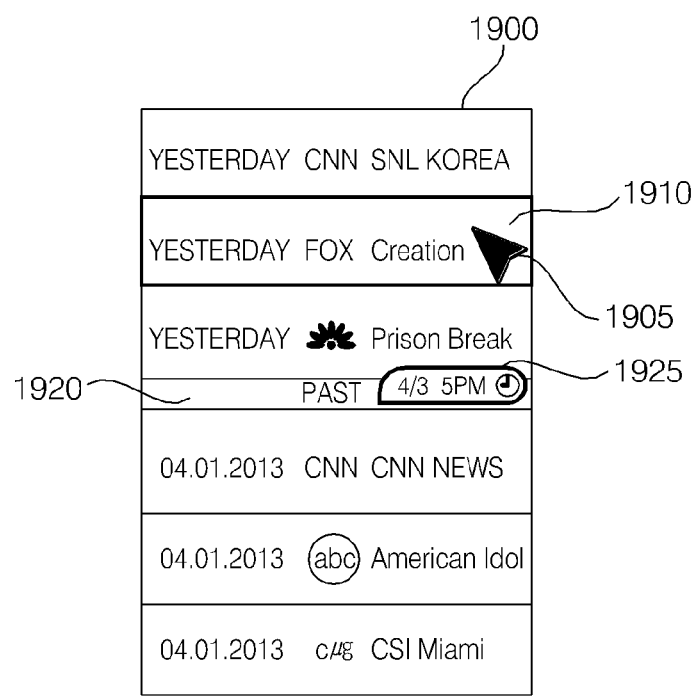

FIG. 19 shows the case in which the user selects past broadcast content.

Referring to FIG. 19, if the user selects or focuses on any one 1910 of the first information items displayed in the past time region 1900 using the pointer 1905, time information 1925 may be displayed at a corresponding position of the timeline 1920. The time information 1925 may be a content production time, e.g., a recording time or a broadcast start time. In addition, a watch icon may be displayed on the timeline according to the time information of the content such that the user intuitively confirms the information.

Figure 20:
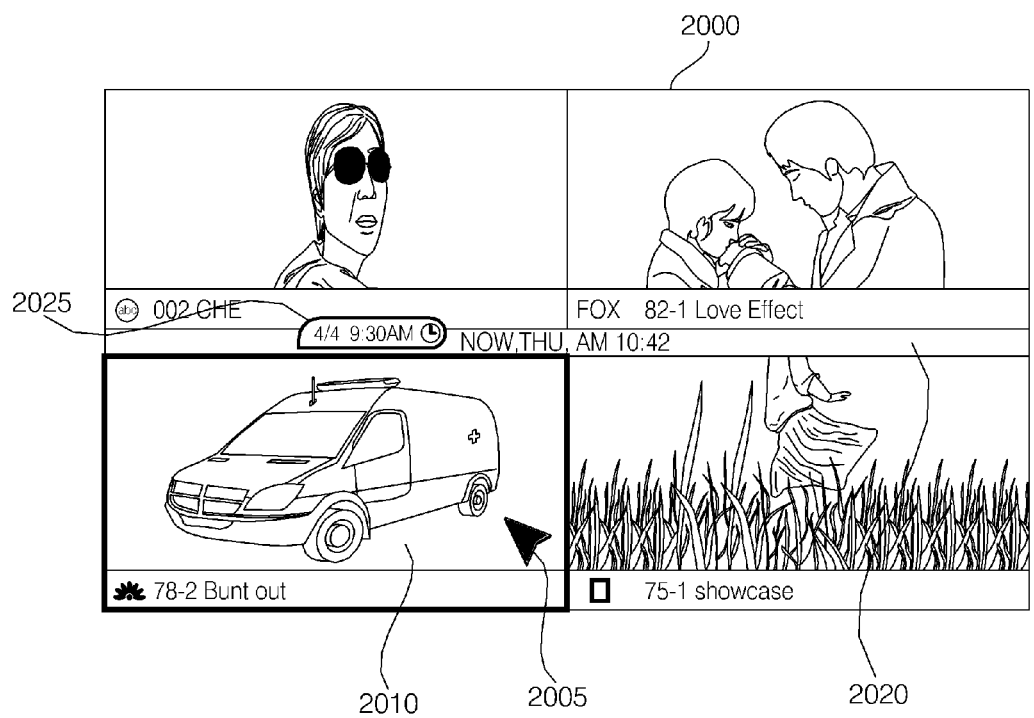

FIG. 20 shows the case in which the user selects current broadcast content.

Referring to FIG. 20, the current time region 2200 is a region for recommending a live broadcast which is currently being broadcast. Content may be arranged based on the current time displayed on the center of the screen in order of broadcast start time.

If the user selects or focuses on any one 2010 of the second information items displayed in the current time region 200 using the pointer 2005, time information 2025 may be displayed at a position corresponding to the content in the timeline 2020 corresponding to the current time region 2020. The time information 2025 may be broadcast start time information.

According to the embodiment, if input for focusing on any one of thumbnail images included in the second information displayed in the current time region is received, a moving image corresponding to the focused thumbnail image may be played back. If content is focused on in order to take advantage of recommendation for live broadcast provided in the current time region, the thumbnail image may be changed to a moving image and the time information may be displayed in the form of a watch on the timeline.

FIG. 21 shows the case in which the user selects current broadcast content.

Referring to FIG. 21, if the user selects or focuses on any one 2110 of the second information items displayed in the future time region 2100 using the pointer 2105, time information 2125 may be displayed at a position corresponding to the content in the timeline 2120. The time information 2125 may be broadcast start time information and a watch icon may be further displayed such that the user intuitively confirms the information.

Referring to FIG. 22, the method for operating the image display apparatus according to the embodiment of the present invention may include a step S2210 of displaying a timeline representing past, current and future time regions based on a current time, a step S2220 of displaying first information about past broadcast programs in a past time region, a step S2230 of displaying second information about broadcast programs which are being broadcast in a current time region, a step S2240 of displaying third information about broadcast programs to be broadcast in a future time region, a step S2250 of receiving input for selecting the timeline, a step S2260 of extending the timeline to include time information selectable by the user, a step S2270 of receiving input for selecting a predetermined position in the extended timeline, a step S2280 of changing a reference time in correspondence with the selected position and a step S2290 of changing items included in the first to third information based on change in reference time.

According to the present invention, the visually differentiated content may be displayed along the timeline and may be easily controlled using the pointer corresponding to movement of the remote controller. Accordingly, it is possible to support various functions and to increase user convenience.

Even in several cases of using content and time information such as content related information, the timeline UI according to the embodiment of the present invention may be applied to provide information. For example, if a specific user logs in, content recently used by the logged-in user may be displayed along the timeline.

If content is selected, the content may be displayed in the timeline such that the user views time information at a glance, and the same watch effect may be obtained.

The image display apparatus and the method for operating the same according to the foregoing embodiments are not restricted to the embodiments set forth herein. Therefore, variations and combinations of the exemplary embodiments set forth herein may fall within the scope of the present invention.

The method for operating an image display apparatus according to the foregoing embodiments may be implemented as code that can be written to a computer-readable recording medium and can thus be read by a processor. The computer-readable recording medium may be any type of recording device in which data can be stored in a computer-readable manner. Examples of the computer-readable recording medium include a ROM, a RAM, a CD-ROM, a magnetic tape, a floppy disk, optical data storage, and a carrier wave (e.g., data transmission over the Internet). The computer-readable recording medium may be distributed over a plurality of computer systems connected to a network so that computer-readable code is written thereto and executed therefrom in a decentralized manner. Functional programs, code, and code segments to realize the embodiments herein can be construed by one of ordinary skill in the art.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for operating an image display apparatus, the method comprising:
displaying a timeline indicating past, current and future time regions based on a current time; displaying first information about a past broadcast program in the past time region; displaying second information about a current broadcast program in the current time region; and displaying third information about a future broadcast program in the future time region, receiving, by a user input interface, input for selecting or focusing on any one of items included in the first to third information; and displaying time information associated with the selected or focused item; wherein items included in the first information displayed in the past time region are displayed in a list type format and items included in the second information displayed in the current time region and the third information displayed in the future time region are displayed in a thumbnail type format, wherein the time information is a recording generation time in case of an item included in the first information and is broadcast start time information in case of an item included in the second information and the third information, and wherein the displaying the first, second and third information is performed by a processor.

2. The method according to claim 1, further comprising:
receiving input for selecting the timeline; and
extending the timeline to include time information selectable by a user.

3. The method according to claim 2, wherein the extending the timeline includes changing a scale of the timeline.

4. The method according to claim 2, wherein the extending the timeline includes extending and displaying a region corresponding to a position of input for selecting the timeline among the past, current and future regions of the timeline.

5. The method according to claim 2, further comprising:
receiving input for selecting a predetermined position in the extended timeline;
changing a reference time in correspondence with the selected position; and
changing items included in the first to third information based on change in reference time.

6. The method according to claim 5,
wherein the changing the reference time includes changing the timeline to indicate the past, current and future time regions based on the changed reference time, and
wherein the changing the information includes displaying information about broadcast programs corresponding to the past, current and future time regions based on the changed reference time.

7. The method according to claim 2, wherein the extending the timeline includes extending and displaying a region corresponding to a position of input for selecting the timeline among the past, current and future time regions of the timeline and deleting the other regions.

8. The method according to claim 7, further comprising extending and displaying information corresponding to the extended region among the first information to the third information and deleting the other information.

9. The method according to claim 2, wherein a time interval included in the time information selectable by the user is changeable by wheel or predetermined key input of a remote controller.

10. The method according to claim 2, wherein the extending the timeline includes increasing the size of the timeline upward and downward.

11. The method according to claim 1, further comprising changing a display position of the timeline.

12. The method according to claim 1, wherein the time information is displayed along with a watch-shaped icon on the timeline.

13. The method according to claim 1, wherein information about a broadcast program included in the second information is information about broadcast programs recently viewed by a user or most popular broadcast programs.

14. The method according to claim 1, wherein the information about the broadcast program included in the first information or the third information is associated with the broadcast program included in the second information.

15. The method according to claim 1, further comprising:
   receiving input for pressing a wheel or predetermined key of a remote controller for a reference time or more; and
   changing a display type of items included in any one of the second information or the third information from the thumbnail type to the list type.

16. The method according to claim 1, further comprising:
   receiving input for focusing on any one of thumbnail images included in the second information; and
   playing a moving image corresponding to the focused thumbnail image back.

* * * * *